United States Patent
Hosoya et al.

(10) Patent No.: US 10,415,459 B2
(45) Date of Patent: Sep. 17, 2019

(54) WARM-UP SYSTEM FOR EXHAUST GAS APPARATUS

(71) Applicant: Toyota Jidosha Kabushiki Kaisha, Toyota-shi, Aichi-ken (JP)

(72) Inventors: Takanobu Hosoya, Gotemba (JP); Yasuyuki Irisawa, Susono (JP); Hirofumi Kubota, Mishima (JP); Takashi Tsunooka, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 113 days.

(21) Appl. No.: 15/729,132

(22) Filed: Oct. 10, 2017

(65) Prior Publication Data

US 2018/0119606 A1    May 3, 2018

(30) Foreign Application Priority Data

Oct. 28, 2016 (JP) .................. 2016-212110

(51) Int. Cl.
*F02B 37/18* (2006.01)
*F01N 3/20* (2006.01)
(Continued)

(52) U.S. Cl.
CPC ............ *F02B 37/18* (2013.01); *F01N 3/2006* (2013.01); *F01N 9/00* (2013.01); *F01N 11/002* (2013.01);
(Continued)

(58) Field of Classification Search
CPC ........ F01N 11/002; F01N 3/2006; F01N 9/00; F01N 2240/20; F01N 2340/06; F01N 2410/00; F01N 2410/06; F01N 2900/08; F01N 2900/1404; F01N 2900/1602; F01N 2900/1626; F02B 37/18; F02B 37/183; Y02T 10/144; Y02T 10/47
(Continued)

(56) References Cited

U.S. PATENT DOCUMENTS 9,995,228 B2 * 6/2018 Zhang .................. F01N 13/009
10,125,671 B2 * 11/2018 Alvarez ................ F01N 3/2006
(Continued)

FOREIGN PATENT DOCUMENTS

JP    2001-050038 A    2/2001
WO    2012/086002 A1    6/2012

*Primary Examiner* — Patrick D Maines
*Assistant Examiner* — Dapinder Singh
(74) *Attorney, Agent, or Firm* — Dinsmore & Shohl LLP

(57) ABSTRACT

A warm-up system for an exhaust gas apparatus includes the exhaust gas apparatus having a turbocharger provided with a turbine, a first exhaust gas control catalyst provided downstream of the turbine, a bypass passage bypassing the turbine, and an adjustment unit adjusting a turbine inflow exhaust gas flow rate and an electronic control unit. The electronic control unit is configured to perform a warm-up control which warms the turbine by controlling the turbine inflow exhaust gas flow rate, by using the adjustment unit, to reach a flow rate higher than zero and lower than the post-warm-up flow rate when an operating state of the internal combustion engine remains constant, such that a warmed state of the first exhaust gas control catalyst is maintained after the first exhaust gas control catalyst is warmed.

5 Claims, 12 Drawing Sheets

(51) Int. Cl.
*F01N 9/00* (2006.01)
*F01N 11/00* (2006.01)

(52) U.S. Cl.
CPC ........ *F02B 37/183* (2013.01); *F01N 2240/20* (2013.01); *F01N 2340/06* (2013.01); *F01N 2410/00* (2013.01); *F01N 2410/06* (2013.01); *F01N 2900/08* (2013.01); *F01N 2900/1404* (2013.01); *F01N 2900/1602* (2013.01); *F01N 2900/1626* (2013.01); *Y02T 10/144* (2013.01); *Y02T 10/47* (2013.01)

(58) Field of Classification Search
USPC ....... 60/274, 277, 286, 295, 299, 602, 605.2
See application file for complete search history.

(56) References Cited

U.S. PATENT DOCUMENTS

| | | | |
|---|---|---|---|
| 2002/0134072 A1* | 9/2002 | Fujieda | F01N 3/20 60/280 |
| 2008/0022678 A1* | 1/2008 | Irisawa | F01N 3/101 60/600 |
| 2012/0240571 A1* | 9/2012 | Otsuka | F02B 37/18 60/601 |
| 2012/0279216 A1 | 11/2012 | Otsuka | |

\* cited by examiner

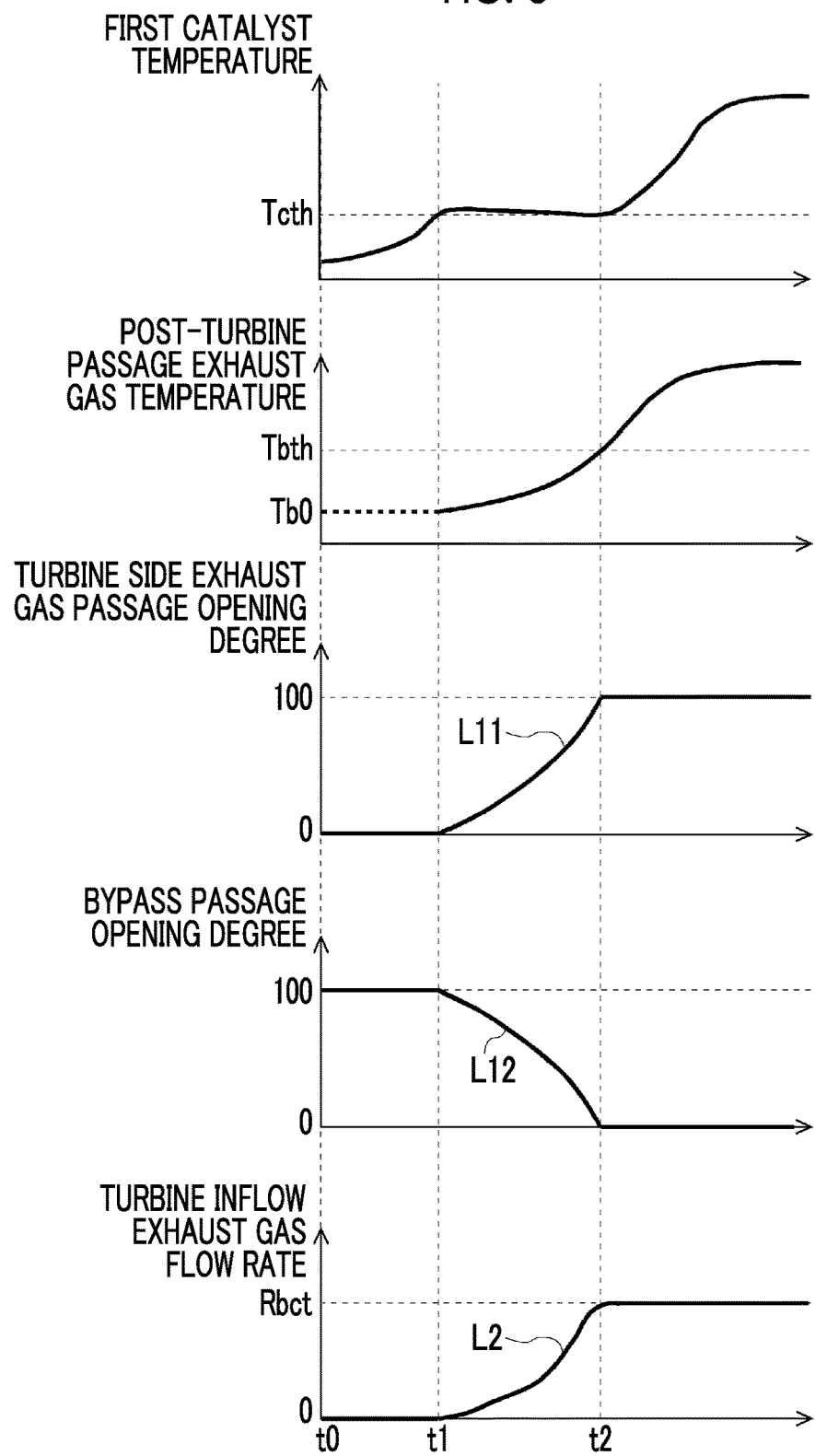

WARM-UP SYSTEM FOR EXHAUST GAS APPARATUS

CROSS-REFERENCE TO RELATED APPLICATIONS

This application claims priority to Japanese Patent Application No. 2016-212110 filed on Oct. 28, 2016 which is incorporated herein by reference in its entirety including the specification, drawings and abstract.

BACKGROUND

1. Technical Field

The disclosure relates to a warm-up system for an exhaust gas apparatus in which an exhaust gas control catalyst is disposed downstream of a turbine of a turbocharger.

2. Description of Related Art

In an exhaust gas apparatus in which an exhaust gas control catalyst is disposed downstream of a turbine of a turbocharger, a high heat capacity of the turbine tends to result in a deterioration of the warm-up property of the exhaust gas control catalyst.

Known in this regard is a technique for opening a waste gate valve and conducting a bypass passage during a cold start of an internal combustion engine that is provided with a turbocharger, the bypass passage bypassing a turbine of the turbocharger, and the waste gate valve disposed on the bypass passage. By this technique being employed, some exhaust gas flows into an exhaust gas control catalyst through the bypass passage for warm-up of the exhaust gas control catalyst once the bypass passage is conducted during the cold start.

Japanese Unexamined Patent Application Publication No. 2001-050038 (JP 2001-050038 A) discloses an internal combustion engine which is provided with an exhaust gas passage switching valve disposed in a merging portion at which a bypass passage and an exhaust gas passage are merged, and which is provided with a turbocharger and the bypass passage bypassing a turbine of the turbocharger. In the internal combustion engine that is disclosed in JP 2001-050038 A, the exhaust gas passage switching valve is controlled, such that the turbine side the exhaust gas passage is fully closed and the bypass passage is fully opened, when an exhaust gas control catalyst disposed on the exhaust gas passage and provided downstream of the switching valve is inert. As a result of this control, nearly 100% of exhaust gas flows into the exhaust gas control catalyst through the bypass passage.

SUMMARY

In the internal combustion engine according to the related art that is provided with the turbocharger, the bypass passage, and the waste gate valve, some of the exhaust gas flows into the exhaust gas control catalyst through the turbine of the turbocharger despite the other of the exhaust gas flowing through the bypass passage. At this time, the thermal energy of the exhaust gas flowing into the exhaust gas control catalyst through the turbine may decrease before the flow of the exhaust gas into the exhaust gas control catalyst due to heat dissipation toward the turbine with a high heat capacity. Then, the warm-up property of the exhaust gas control catalyst may deteriorate.

In the related art in which the exhaust gas passage switching valve is disposed (JP 2001-050038 A), in contrast, no exhaust gas flows into the turbine side exhaust gas passage when the exhaust gas control catalyst is inert, and thus a deterioration of warm-up property of the exhaust gas control catalyst that is attributable to heat dissipation toward the turbine tends to be suppressed. At this time, the turbine and the turbine side exhaust gas passage tend to remain in a cold state. In the related art, the exhaust gas passage switching valve is controlled such that the turbine side exhaust gas passage is fully open once the warm-up of the exhaust gas control catalyst is completed, and then nearly 100% of the exhaust gas flows into the exhaust gas control catalyst through the passage. At this time, the temperature of the exhaust gas flowing into the exhaust gas control catalyst may become lower than before due to heat dissipation toward the turbine and the turbine side exhaust gas passage that tend to remain in the cold state. As a result, the temperature of the warmed-up exhaust gas control catalyst may fall below the activation temperature of the exhaust gas control catalyst, and the exhaust gas control capacity of the exhaust gas control catalyst may decline.

The disclosure is to suppress a decline in the exhaust gas control capacity of an exhaust gas control catalyst by suitably warming-up an exhaust gas apparatus.

An aspect relates to a warm-up system for an exhaust gas apparatus including an exhaust gas apparatus including a turbocharger, a first exhaust gas control catalyst, a bypass passage and an adjustment unit. The turbocharger is provided with a turbine, and is disposed on an exhaust gas passage of an internal combustion engine. The first exhaust gas control catalyst is disposed on the exhaust gas passage disposed downstream of the turbine. The bypass passage branches from the exhaust gas passage upstream of the turbine, bypasses the turbine, and merges with the exhaust gas passage disposed upstream of the first exhaust gas control catalyst. The adjustment unit is configured to adjust a turbine inflow exhaust gas flow rate, which is a flow rate of exhaust gas flowing into the turbine, by changing a ratio between the turbine inflow exhaust gas flow rate and a flow rate of exhaust gas flowing into the bypass passage. The warm-up system further includes an electronic control unit configured to control the turbine inflow exhaust gas flow rate by using the adjustment unit, such that the turbine inflow exhaust gas flow rate reaches a post-warm-up flow rate which depends on operation states of the internal combustion engine, after the first exhaust gas control catalyst and the turbine are warmed. The electronic control unit is configured to perform a first warm-up control which warms the first exhaust gas control catalyst by controlling the turbine inflow exhaust gas flow rate, by using the adjustment unit, to reach zero, when a temperature of the first exhaust gas control catalyst is lower than an activation temperature of the first exhaust gas control catalyst. The electronic control unit is configured to perform a second warm-up control which warms the turbine by controlling the turbine inflow exhaust gas flow rate, by using the adjustment unit, to reach a flow rate higher than zero and lower than the post-warm-up flow rate when an operating state of the internal combustion engine remains constant, such that a warmed state of the first exhaust gas control catalyst is maintained after the first exhaust gas control catalyst is warmed by the first warm-up control.

According to the aspect, the warm-up system for the exhaust gas apparatus is capable of performing the warm-up of the turbine while maintaining the warmed state of the first exhaust gas control catalyst by controlling the turbine inflow exhaust gas flow rate. Accordingly, a decline in the exhaust gas control capacity of the exhaust gas control catalyst can be suppressed.

In addition, in the aspect, the electronic control unit may control the turbine inflow exhaust gas flow rate based on the temperature of the first exhaust gas control catalyst and a post-turbine passage exhaust gas temperature, which is a temperature of the exhaust gas which has passed through the turbine and before merging with the exhaust gas that has passed through the bypass passage. The electronic control unit may allow the turbine inflow exhaust gas flow rate to become lower as the temperature of the first exhaust gas control catalyst is lowered or the post-turbine passage exhaust gas temperature is lowered when the turbine inflow exhaust gas flow rate is controlled to reach the flow rate lower than the post-warm-up flow rate when the operating state of the internal combustion engine remains constant.

According to the aspect, the warm-up system for the exhaust gas apparatus is capable of completing the warm-up of the turbine as quickly as possible while maintaining the warmed state of the first exhaust gas control catalyst by controlling the turbine inflow exhaust gas flow rate at a time when the turbine is warmed as described above. As a result, the exhaust gas apparatus is suitably warmed-up and a decline in the exhaust gas control capacity of the exhaust gas control catalyst can be suitably suppressed.

According to the aspect, the warm-up system for the exhaust gas apparatus is capable of warming the second exhaust gas control catalyst by the electronic control unit relatively early by controlling the turbine inflow exhaust gas flow rate as described above. As a result, the exhaust gas apparatus is suitably warmed-up and a decline in the exhaust gas control capacity of the exhaust gas control catalyst can be suppressed.

In the aspect, the exhaust gas passage may include the turbine side exhaust gas passage passing through the turbine from the branching portion where the bypass passage branches. The adjustment unit may include a first valve disposed on a passage between the branching portion and the turbine on the turbine side exhaust gas passage and adjusting the flow rate of the exhaust gas flowing into the turbine and a second valve disposed on the bypass passage and adjusting the flow rate of the exhaust gas flowing through the bypass passage.

In the aspect, the exhaust gas passage may include the turbine side exhaust gas passage passing through the turbine from the branching portion where the bypass passage branches. The adjustment unit may include the distribution valve disposed in the merging portion where the turbine side exhaust gas passage and the bypass passage merge with each other.

According to the aspect, a decline in the exhaust gas control capacity of an exhaust gas control catalyst can be suppressed by an exhaust gas apparatus being suitably warmed-up.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 8 is a diagram illustrating time transitions of a first catalyst temperature, a post-turbine passage exhaust gas temperature, a turbine side exhaust gas passage opening degree, a bypass passage opening degree, and a turbine inflow exhaust gas flow rate according to the modification example of Example 1;

DETAILED DESCRIPTION OF EMBODIMENTS

Hereinafter, an embodiment will be described in detail and indicatively based on examples with reference to accompanying drawings. The dimensions, materials, shapes, relative dispositions, and so on of components according to the examples do not limit the scope of the disclosure unless otherwise noted.

EXAMPLE 1

Figure 1:
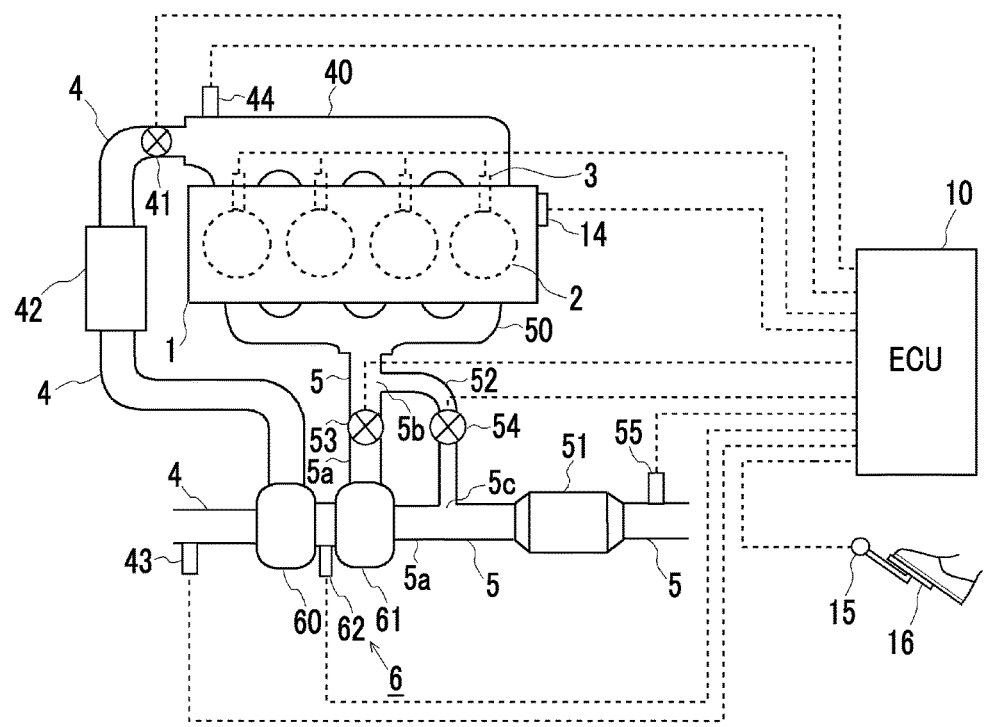
FIG. 1 is a diagram illustrating a schematic configuration of an internal combustion engine according to Example 1 and a schematic configuration of an intake and exhaust system of the internal combustion engine.

Hereinafter, a first example will be described with reference to accompanying drawings. FIG. 1 is a diagram illustrating a schematic configuration of an internal combustion engine according to this example and a schematic configuration of an intake and exhaust system of the internal combustion engine. An internal combustion engine 1 illustrated in FIG. 1 is a spark ignition-type internal combustion engine (gasoline engine) that is provided with a cylinder group which includes four cylinders 2. Fuel injection valves 3 are disposed in the internal combustion engine 1, and the fuel injection valves 3 inject a fuel into respective intake ports. The fuel injection valves 3 may be configured to inject the fuel directly into the respective cylinders 2. Spark plugs (not illustrated) for igniting air-fuel mixtures in the cylinders are attached to the respective cylinders 2.

The internal combustion engine 1 is connected to an intake manifold 40 and an exhaust manifold 50. An intake passage 4 is connected to the intake manifold 40. A compressor 60 of a turbocharger 6, which is operated by energy of exhaust gas being used as a drive source, is disposed in the middle of the intake passage 4. An intercooler 42, which performs heat exchange between intake air and outside air, is disposed on the intake passage 4 and provided downstream of the compressor 60. A throttle valve 41 is disposed on the intake passage 4 and provided downstream of the intercooler 42. The throttle valve 41 adjusts the amount of the air taken into the internal combustion engine 1 by changing a passage sectional area in the intake passage 4. An intake manifold pressure sensor 44 is disposed on the intake manifold 40 connected downstream of the throttle valve 41 to the intake passage 4. The intake manifold pressure sensor 44 outputs an electric signal depending on the pressure of the intake air in the intake manifold 40 (hereinafter, referred to as an "intake manifold pressure" in some cases). An air flow meter 43 is disposed on the intake passage 4 and provided upstream of the compressor 60. The air flow meter 43 outputs an electric signal depending on the amount (mass) of the intake air (air) flowing through the intake passage 4.

An exhaust gas passage 5 is connected to the exhaust manifold 50. A turbine 61 of the turbocharger 6, a first exhaust gas control catalyst 51, and a first temperature sensor 55 are disposed in the middle of the exhaust gas passage 5 and in this order reflecting the flow of the exhaust gas. The first exhaust gas control catalyst 51 is, for example, a three-way catalyst. The first temperature sensor 55 outputs an electric signal depending on the temperature of the exhaust gas. A bypass passage 52 is disposed on the exhaust gas passage 5. The bypass passage 52 branches from a branching portion 5b in the middle of the section of the exhaust gas passage 5 that is provided upstream of the turbine 61, bypasses the turbine 61, and merges with a merging portion 5c in the middle of the section of the exhaust gas passage 5 that is provided upstream of the first exhaust gas control catalyst 51. The section of the exhaust gas passage 5 that reaches the merging portion 5c through the turbine 61 from the branching portion 5b will be referred to as a turbine side exhaust gas passage 5a. A turbo bypass valve (hereinafter, referred to as a "TBV" in some cases) 53 is disposed in the section of the turbine side exhaust gas passage 5a that is provided between the branching portion 5b and the turbine 61. A waste gate valve (hereinafter, referred to as a "WGV" in some cases) 54 is disposed on the bypass passage 52. The TBV 55 adjusts the flow rate of the exhaust gas flowing into the turbine 61 (hereinafter, referred to as a "turbine inflow exhaust gas flow rate" in some cases) by changing a passage sectional area in the section of the turbine side exhaust gas passage 5a that is provided upstream of the turbine 61. The WGV 54 adjusts the flow rate of the exhaust gas flowing through the bypass passage 52 (hereinafter, referred to as a "bypass flow rate" in some cases) by changing a passage sectional area in the bypass passage 52. The TBV 53 may be disposed in the section of the turbine side exhaust gas passage 5a that is provided between the turbine 61 and the merging portion 5c.

The turbine inflow exhaust gas flow rate changes depending on the opening degree of a valve body of the TBV 53 (hereinafter, referred to as a "TBV opening degree" in some cases), and the bypass flow rate changes depending on the opening degree of a valve body of the WGV 54 (hereinafter, referred to as a "WGV opening degree" in some cases). In an exhaust gas apparatus according to this example, not only the turbine inflow exhaust gas flow rate but also the bypass flow rate can change depending on the TBV opening degree. Likewise, not only the bypass flow rate but also the turbine inflow exhaust gas flow rate can change depending on the WGV opening degree. In other words, the ratio between the turbine inflow exhaust gas flow rate and the bypass flow rate is changed by the TBV 53 and the WGV 54 (by the TBV opening degree and the WGV opening degree). Accordingly, in this example, the TBV 53 and the WGV 54 are examples of an adjustment unit. In principle, the valve body of the WGV 54 is fully opened when a warm-up system for the exhaust gas apparatus performs control for warming-up the turbine 61 (described later). In other words, the ratio between the turbine inflow exhaust gas flow rate and the bypass flow rate is changed by the TBV 53 and the fully open WGV 54 (by the TBV opening degree in substance).

A rotation sensor 62 is disposed in the turbocharger 6. The rotation sensor 62 outputs an electric signal depending on the rotation speed of the turbocharger 6.

An electronic control unit (ECU) 10 is installed in the internal combustion engine 1. The ECU 10 is a unit that controls operation states of the internal combustion engine 1 and the like. Various sensors such as a crank position sensor 14 and an accelerator position sensor 15 as well as the above-described air flow meter 43, intake manifold pressure sensor 44, first temperature sensor 55, and rotation sensor 62 are electrically connected to the ECU 10. The crank position sensor 14 is a sensor that outputs an electric signal which correlates with the rotational position of an engine output shaft (crankshaft) of the internal combustion engine 1. The accelerator position sensor 15 is a sensor that outputs an electric signal which correlates with the amount by which an accelerator pedal 16 is operated (accelerator operation amount). Output signals are input to the ECU 10 from the above-described sensors. The ECU 10 derives the engine rotation speed of the internal combustion engine 1 based on the output signal from the crank position sensor 14 and derives the engine load of the internal combustion engine 1 based on the output signal from the accelerator position sensor 15. In addition, the ECU 10 estimates the flow rate of the exhaust gas flowing into the first exhaust gas control catalyst 51 (hereinafter, referred to as an "exhaust gas flow rate" in some cases) based on the value that is output by the air flow meter 43 and estimates the temperature of the first exhaust gas control catalyst 51 (hereinafter, referred to as a "first catalyst temperature" in some cases) based on the value that is output by the first temperature sensor 55.

Various equipment such as the fuel injection valves 3, the throttle valve 41, the TBV 53, and the WGV 54 are electrically connected to the ECU 10. The ECU 10 controls the various equipment based on the output signals from the sensors described above. For example, the ECU 10 calculates a required intake manifold pressure based on the accelerator operation amount or the like after warm-up of the first exhaust gas control catalyst 51 and the warm-up of the turbine 61 are completed. Then, the ECU 10 controls the TBV 53 and the WGV 54 in accordance with the operation states of the internal combustion engine 1, such that the back pressure of the internal combustion engine 1 becomes as low as possible, in a case where the required intake manifold pressure is equal to or lower than the atmospheric pressure, that is, in a case where a turbocharging request is absent. In this case, for example, the valve bodies of the TBV 53 and the WGV 54 are fully opened. Hereinafter, the turbine inflow exhaust gas flow rate that is determined depending on the operation states of the internal combustion engine 1 with no turbocharging request established after the completion of the warm-up of the first exhaust gas control catalyst 51 and the turbine 61 will be referred to as a "post-warm-up flow rate". The ECU 10 functions as post-warm-up flow rate control means by controlling the turbine inflow exhaust gas flow rate such that it reaches the post-warm-up flow rate.

In a case where the required intake manifold pressure is higher than the atmospheric pressure, that is, in a case where the turbocharging request is present, the ECU 10 controls the WGV opening degree in accordance with the required intake manifold pressure in order to respond to the turbocharging request. Specifically, the ECU 10 reduces the WGV opening degree as the required intake manifold pressure increases. In a case where the turbocharging request is present even after the completion of the warm-up of the first exhaust gas control catalyst 51 and the turbine 61, the ECU 10 controls the WGV opening degree as described above, and thus the turbine inflow exhaust gas flow rate undergoes no control for reaching the post-warm-up flow rate.

Once the valve body of the TBV 53 is fully closed by the ECU 10, the turbine inflow exhaust gas flow rate reaches approximately zero. At this time, the valve body of the WGV 54 is open by the ECU 10 and nearly 100% of the exhaust gas flows into the first exhaust gas control catalyst 51 through the bypass passage 52. By the ECU 10 controlling the TBV 53 and the WGV 54 as described above, effects of heat movement to and from the turbine 61 can be excluded with regard to the exhaust gas flowing into the first exhaust gas control catalyst 51. The ECU 10 fully closes the valve body of the TBV 53 and fully opens the valve body of the WGV 54 by controlling the valve bodies in a case where the first catalyst temperature is lower than the activation temperature of the catalyst (that is, in a case where the first exhaust gas control catalyst 51 is yet to be warmed-up). As a result, the turbine inflow exhaust gas flow rate is controlled such that it reaches zero, a decrease in the thermal energy of the exhaust gas that is attributable to heat dissipation toward the turbine 61 with a high heat capacity can be suppressed, and thus the warm-up of the first exhaust gas control catalyst 51 can be completed relatively early. Hereinafter, this control by which the ECU 10 performs the warm-up of the first exhaust gas control catalyst 51 as described above will be referred to as "first warm-up control". The ECU 10 functions as first warm-up control means by performing the first warm-up control.

It can be assumed that, for example, the turbine inflow exhaust gas flow rate is controlled by the ECU 10, such that it reaches the flow rate that is equal in value to the post-warm-up flow rate, immediately after the completion of the warm-up of the first exhaust gas control catalyst 51. In a case where the turbine 61 and the turbine side exhaust gas passage 5a remain in a cold state at this time, flowing of the exhaust gas into the first exhaust gas control catalyst 51 through the turbine 61 may result in a decrease in the thermal energy of the exhaust gas flowing into the first exhaust gas control catalyst 51 that is attributable to heat dissipation toward the turbine 61 and cause the temperature of the warmed-up first exhaust gas control catalyst 51 to fall below the activation temperature of the first exhaust gas control catalyst 51. This will be described below based on FIG. 2.

Figure 2:
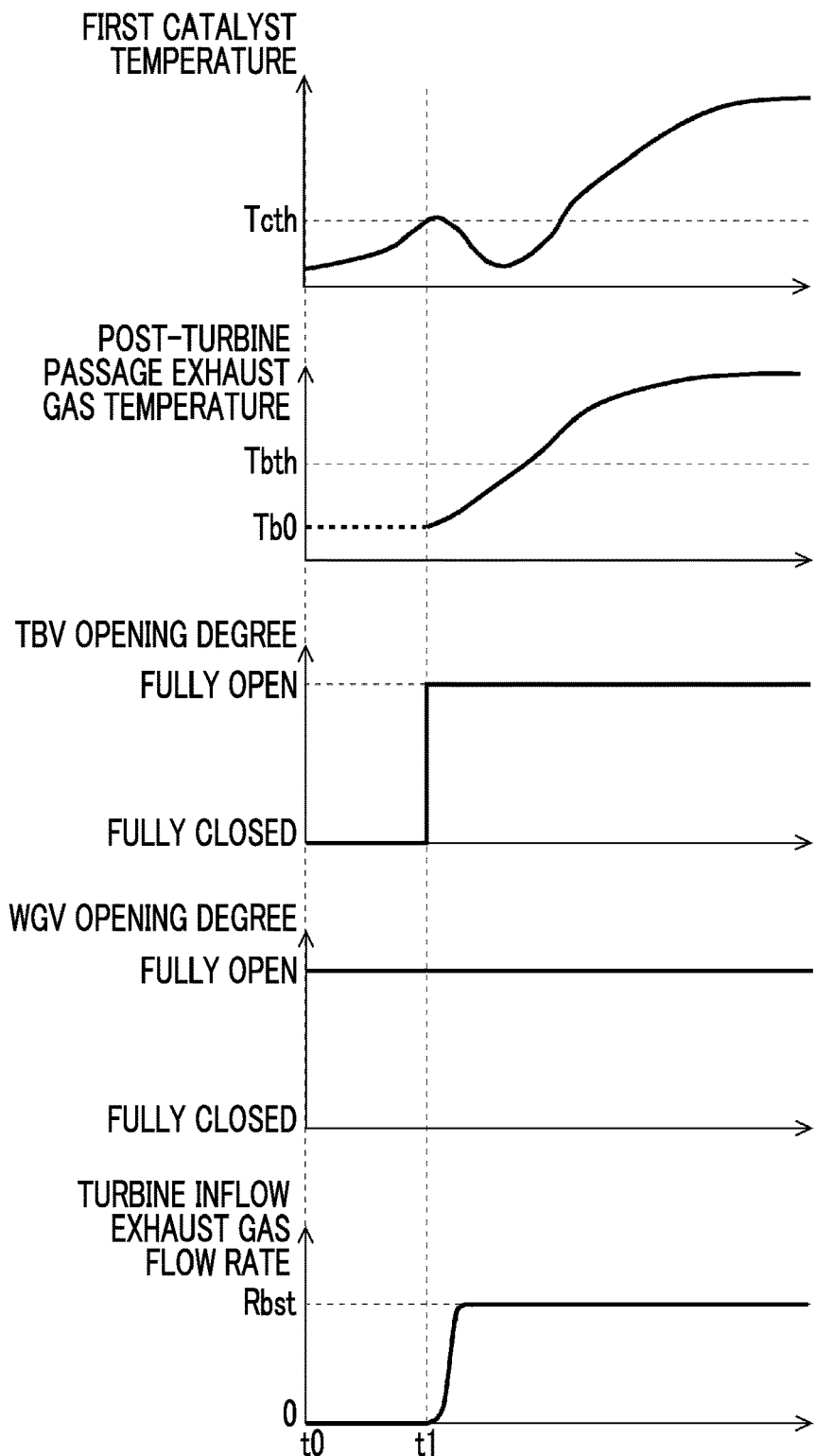
FIG. 2 is a diagram illustrating time transitions of a first catalyst temperature, a post-turbine passage exhaust gas temperature, a TBV opening degree, a WGV opening degree, and a turbine inflow exhaust gas flow rate in a case where exhaust gas with a standard flow rate passes through a turbine and flows into a first exhaust gas control catalyst immediately after warm-up of the first exhaust gas control catalyst is completed.

FIG. 2 is a diagram illustrating time transitions of the first catalyst temperature, the temperature of the exhaust gas after passage through the turbine 61 and before merging with the exhaust gas that has passed through the bypass passage 52 (hereinafter, referred to as a "post-turbine passage exhaust gas temperature" in some cases), the TBV opening degree, the WGV opening degree, and the turbine inflow exhaust gas flow rate. The first warm-up control is performed in the period of time t0 to time t1 that is illustrated in FIG. 2. The warm-up of the first exhaust gas control catalyst 51 is completed at time t1, when the first catalyst temperature reaches an activation temperature Tcth. During the first warm-up control, the valve body of the TBV 53 remains fully closed by the ECU 10 and the valve body of the WGV 54 remains fully open by the ECU 10 as described above. At this time, the turbine inflow exhaust gas flow rate is approximately zero. How to define the post-turbine passage exhaust gas temperature poses a problem when the turbine inflow exhaust gas flow rate is zero, that is, when no exhaust gas has flowed into the first exhaust gas control catalyst 51 through the turbine 61. In FIG. 2, the post-turbine passage exhaust gas temperature from time t0 to time t1 is illustrated in the form of a dashed line, in view of the temperature of the turbine 61, in this regard.

At time t1, when the warm-up of the first exhaust gas control catalyst 51 is completed, the valve body of the TBV 53 is fully opened for the turbine inflow exhaust gas flow rate to reach the flow rate that is equal in value to the post-warm-up flow rate (hereinafter, referred to as a "standard flow rate" in some cases) Rbst. A post-turbine passage exhaust gas temperature Tb0 at time t1 is lower than a predetermined temperature Tbth, and the ECU 10 determines that the warm-up of the turbine 61 is yet to be completed at time t1. The predetermined temperature Tbth is a temperature for the ECU 10 to determine that the warm-up of the turbine 61 has been completed. The ECU 10 determines that the warm-up of the turbine 61 has bees completed in a case where the post-turbine passage exhaust gas temperature is equal to or higher than the predetermined temperature Tbth. This warm-up completion state of the turbine 61 refers to a state where the temperature of the turbine 61 has been raised to the extent of being capable of avoiding falling of the temperature of the first exhaust gas control catalyst 51 below the activation temperature of the first exhaust gas control catalyst 51, that is, to the extent of being capable of maintaining the warm-up completion state of the first exhaust gas control catalyst 51, even if the turbine inflow exhaust gas flow rate is at the post-warm-up flow rate (for example, the turbine inflow exhaust gas flow rate that allows the back pressure of the internal combustion engine 1 to become as low as possible) in a case where the exhaust gas flows into the first exhaust gas control catalyst 51 through the turbine 61 after the completion of the warm-up of the first exhaust gas control catalyst 51.

As is apparent from the warm-up completion state of the turbine 61 defined as described above, the warm-up completion state of the turbine 61 and the first catalyst temperature are closely related to each other, and thus the predetermined temperature Tbth for the ECU 10 to determine that the warm-up of the turbine 61 has been completed is also a temperature closely related to the first catalyst temperature. The predetermined temperature Tbth is defined as, for example, a temperature reflecting effects of heat dissipation or the like through an exhaust gas pipe or the like that reaches the first exhaust gas control catalyst 51 from the turbine 61 in the activation temperature of the first exhaust gas control catalyst 51 (it may also be a temperature reflecting a predetermined variation in the activation temperature). This is because the temperature of the catalyst inflow exhaust gas that flows into the first exhaust gas control catalyst 51 through the turbine 61 becomes equal to or higher than the activation temperature of the first exhaust gas control catalyst 51 and the temperature of the first exhaust gas control catalyst 51 is unlikely to fall below the activation temperature Tcth in a case where the turbine 61 reaches the warm-up completion state and the post-turbine passage exhaust gas temperature becomes equal to or higher than the predetermined temperature Tbth defined as described above.

As illustrated in FIG. 2, the temperature of the warmed-up first exhaust gas control catalyst 51 falls below the activation temperature Tcth as the exhaust gas with the standard flow rate Rbst flows into the first exhaust gas control catalyst 51 through the turbine 61 in a non-warm-up completion state. This may lead to a decline in the exhaust gas control capacity of the first exhaust gas control catalyst 51.

In this regard, the ECU 10 performs the warm-up of the turbine 61 by controlling the turbine inflow exhaust gas flow rate, such that the turbine inflow exhaust gas flow rate reaches a flow rate higher than zero and lower than the post-warm-up flow rate when the operating state of the internal combustion engine remains constant, for the warm-up completion state of the first exhaust gas control catalyst 51 to be maintained after the completion of the warm-up of the first exhaust gas control catalyst 51. This control by which the ECU 10 performs the warm-up of the turbine 61 as described above will be referred to as "second warm-up control". Hereinafter, the second warm-up control will be described based on FIG. 3. The ECU 10 functions as second warm-up control means by performing the second warm-up control.

Figure 3:
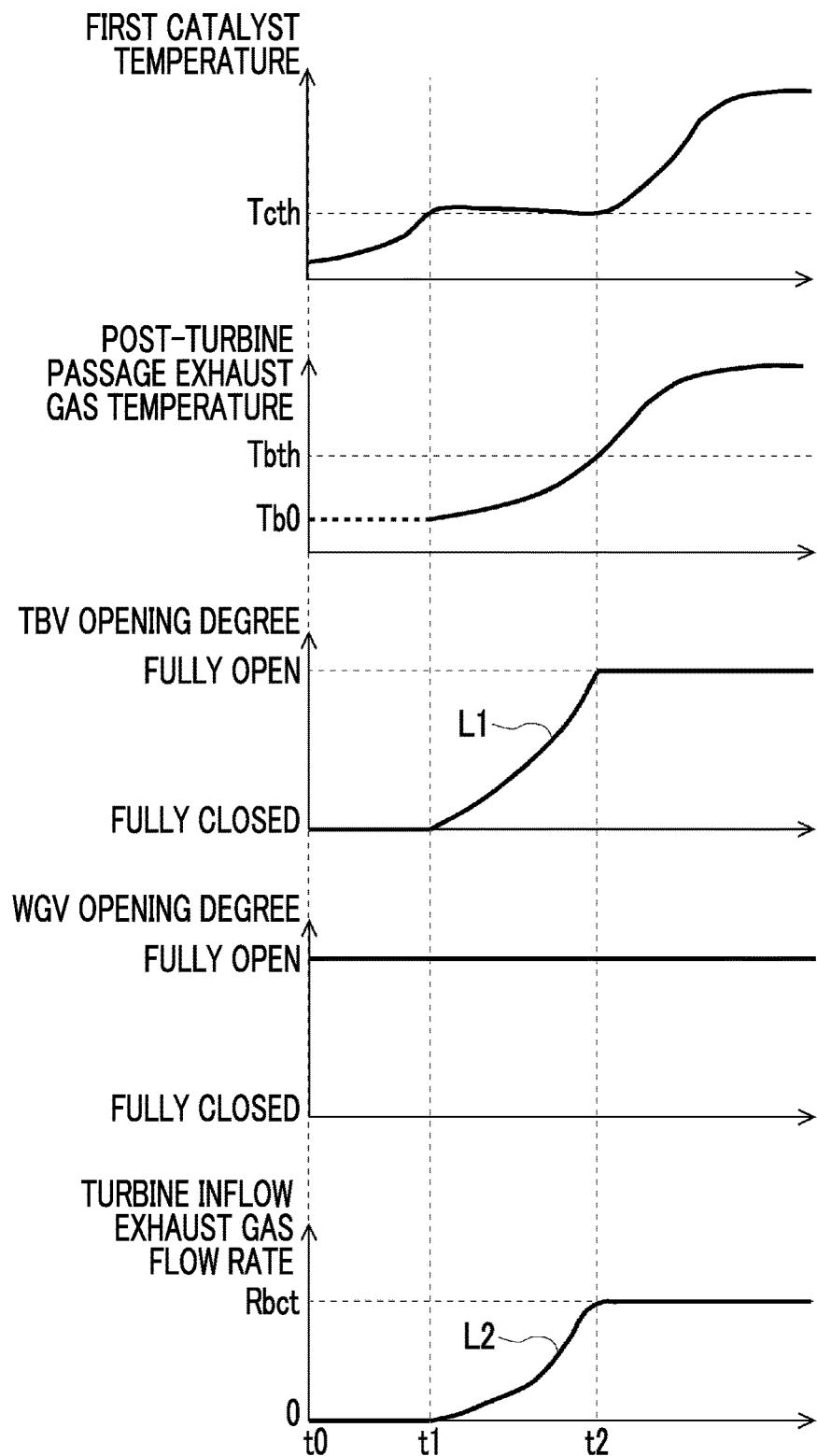
FIG. 3 is a diagram illustrating time transitions of a first catalyst temperature, a post-turbine passage exhaust gas temperature, a TBV opening degree, a WGV opening degree, and a turbine inflow exhaust gas flow rate according to Example 1.

As is the case with FIG. 2, FIG. 3 is a diagram illustrating time transitions of the first catalyst temperature, the post-turbine passage exhaust gas temperature, the TBV opening degree, the WGV opening degree, and the turbine inflow exhaust gas flow rate. As illustrated in FIG. 3, the ECU 10 controls the opening degree of the valve body of the TBV 53, such that it reaches an opening degree exceeding full closing and falling short of full opening, after the warm-up of the first exhaust gas control catalyst 51 is completed at time t1. As a result, the turbine inflow exhaust gas flow rate reaches a flow rate that is higher than zero and lower than a post-warm-up flow rate Rbct when the operating state of the internal combustion engine 1 remains constant. The post-warm-up flow rate Rbct is a flow rate that is determined in accordance with the operation state of the internal combustion engine 1 for the back pressure of the internal combustion engine 1 to become as low as possible as described above. The post-warm-up flow rate Rbct is substantially equal in value to the standard bow rate Rbst illustrated in FIG. 2. At this time, the valve body of the WGV 54 remains fully open.

Figure 4:
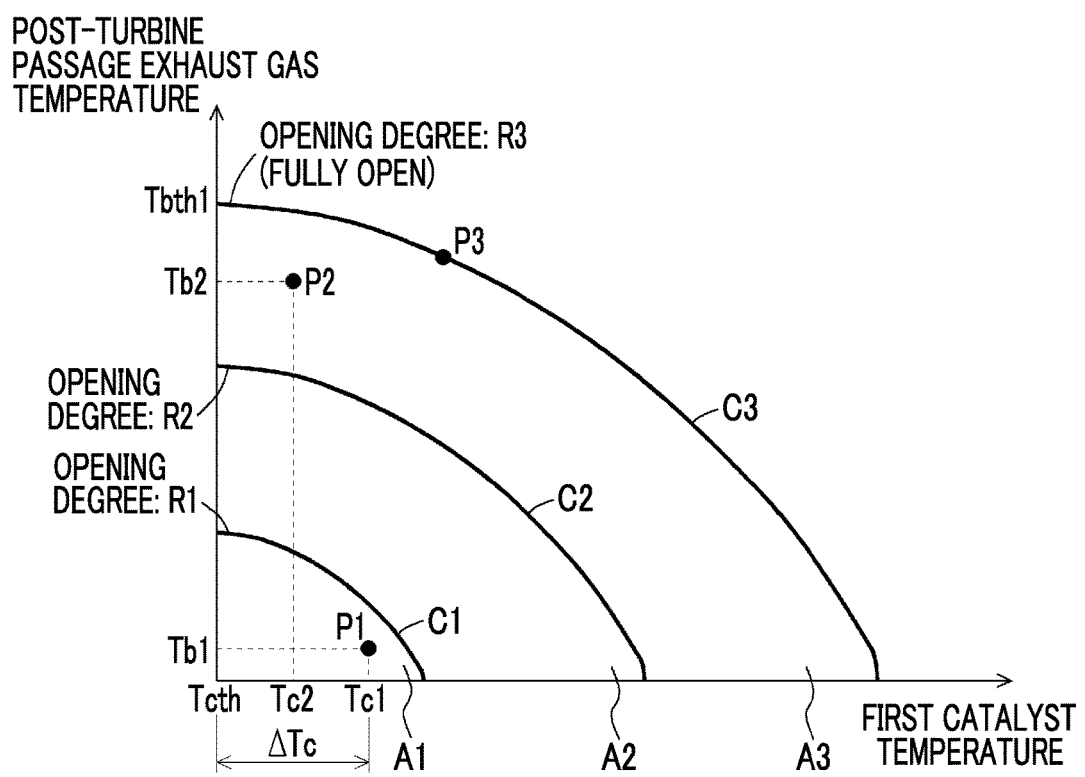
FIG. 4 is a diagram illustrating relationships of the first catalyst temperature and the post-turbine passage exhaust gas temperature with the TBV opening degree in second warm-up control according to Example 1.

The TBV opening degree control that is performed by the ECU 10 for the turbine inflow exhaust gas flow rate to reach the flow rate that is higher than zero and lower than the post-warm-up flow rate Rbct when the operating state of the internal combustion engine 1 remains constant will be described in detail below. A line L1 that is illustrated in FIG. 3 shows an aspect of the TBV opening degree control. The TBV opening degree that is shown by the line L1 is calculated based on the first catalyst temperature and the post-turbine passage exhaust gas temperature. The calculation of the TBV opening degree that is shown by the line L1 will be described based on FIG. 4. FIG. 4 is a diagram illustrating relationships of the first catalyst temperature and the post-turbine passage exhaust gas temperature with the TBV opening degree in the second warm-up control. At this time, the valve body of the WGV 54 remains fully open as illustrated in FIG. 3. In FIG. 4, a curve C1 represents the first catalyst temperature and the post-turbine passage exhaust gas temperature at a time when the TBV opening degree is an opening degree R1, a curve C2 represents the first catalyst temperature and the post-turbine passage exhaust gas temperature at a time when the TBV opening degree is an opening degree R2, and a curve C3 represents the first catalyst temperature and the post-turbine passage exhaust gas temperature at a time when the TBV opening degree is an opening degree R3. The TBV opening degree increases in the order of the opening degrees R1, R2, R3, and the opening degree R3 represents the TBV opening degree at a time when the valve body of the TBV 53 is fully open. As illustrated in FIG. 4, a point P1 (Tc1, Tb1), which shows a state where the first catalyst temperature is Tc1 and the post-turbine passage exhaust gas temperature is Tb1, belongs to a region A1 surrounded by the X axis, the Y axis, and the curve C1. The TBV opening degree at this time is an opening degree that exceeds opening degree 0, which represents full closing, and falls short of the opening degree R1. A point P2 (Tc2, Tb2) belongs to a region A3 surrounded by the X axis, the Y axis, the curve C2, and the curve C3. The TBV opening degree at this time is an opening degree that exceeds the opening degree R2 and falls short of the opening degree R3.

The flow rate and the temperature of the catalyst inflow exhaust gas that flows into the first exhaust gas control catalyst 51 through the turbine 61 and the flow rate and the temperature of the catalyst inflow exhaust gas that flows into the first exhaust gas control catalyst 51 through the bypass passage 52 affect the first catalyst temperature. The second warm-up control is to control the turbine inflow exhaust gas flow rate and perform the warm-up of the turbine 61 for the warm-up completion state of the first exhaust gas control catalyst 51 to be maintained. Accordingly, in the second warm-up control, the turbine inflow exhaust gas flow rate is controlled for the warm-up completion state of the first exhaust gas control catalyst 51 to be maintained based on flowing into the first exhaust gas control catalyst 51 of mixed exhaust gas in which the exhaust gas that has declined in temperature through the turbine 61 and the exhaust gas with a temperature maintained at a high temperature through the bypass passage 52 are mixed with each other. For example, the first catalyst temperature Tc1 represented by the point P1 in FIG. 4 is the temperature that exceeds the activation temperature Tcth by a margin of ΔTc. In other words, the first exhaust gas control catalyst 51 at this time has a margin of ΔTc until reaching the non-warm-up completion state from the warm-up completion state. The warm-up completion state of the first exhaust gas control catalyst 51 can be maintained once the turbine inflow exhaust gas flow rate is set such that the difference between the first catalyst temperature and the activation temperature Tcth during the second warm-up control is equal to or greater than zero. FIG. 4 is mapping of the TBV opening degree determining the ratio between the turbine inflow exhaust gas flow rate and the bypass flow rate for reaching that turbine inflow exhaust gas flow rate.

In the map of the TBV opening degree that is illustrated in FIG. 4, the margin until the first exhaust gas control catalyst 51 reaches the non-warm-up completion state increases as the first catalyst temperature increases, that is, when the difference between the first catalyst temperature and the activation temperature Tcth is large. Accordingly, the TBV opening degree increases when the difference is large. As a result, the turbine inflow exhaust gas flow rate increases with the warm-up completion state of the first exhaust gas control catalyst 51 maintained, and thus the warm-up of the turbine 61 can be completed as quickly as possible.

Once the second warm-up control is performed, the turbine temperature continues to rise. Accordingly, the post-turbine passage exhaust gas temperature rises as a result of the second warm-up control. As the post-turbine passage exhaust gas temperature rises, the first catalyst temperature becomes unlikely to fall. Accordingly, in the map of the TBV opening degree that is illustrated in FIG. 4, the TBV opening degree increases when the post-turbine passage exhaust gas temperature is high. Comparing the states represented by the point P1 and the point P2 in FIG. 4 to each other, for example, the post-turbine passage exhaust gas temperature Tb2 in the state represented by the point P2 is higher than the post-turbine passage exhaust gas temperature Tb1 in the state represented by the point P1. As a result, the TBV opening degree is higher.

According to FIG. 4, the valve body of the TBV 53 is fully opened once the post-turbine passage exhaust gas temperature reaches a temperature Tbth1 when the first catalyst temperature is at the activation temperature Tcth. In other words, the turbine 61 is in its warm-up completion state at this time. As described above, the ECU 10 determines that the warm-up of the turbine 61 has been completed in a case where the post-turbine passage exhaust gas temperature is equal to or higher than the predetermined temperature Tbth. The state in FIG. 4 where the first catalyst temperature is at the activation temperature Tcth and the post-turbine passage exhaust gas temperature is at the temperature Tbth1 is the warm-up completion state of the turbine 61, and thus the post-turbine passage exhaust gas temperature Tbth1 represents the predetermined temperature Tbth. The predetermined temperature Tbth is, for example, the temperature reflecting the effects of the heat dissipation or the like through the exhaust gas pipe or the like that reaches the first exhaust gas control catalyst 51 from the turbine 61 in the activation temperature of the first exhaust gas control catalyst 51. Accordingly, the temperature Tbth1 represents, for example, a temperature reflecting the effects of the heat dissipation or the like through the exhaust gas pipe or the like in the activation temperature Tcth.

In the map of the TBV opening degree that is illustrated in FIG. 4, the TBV opening degree is determined in view of the difference between the first catalyst temperature and the activation temperature Tcth as described above. Accordingly, the ECU 10 is capable of determining in some cases that the turbine 61 is in the warm-up completion state, even if the post-turbine passage exhaust gas temperature is lower than the temperature Tbth1, in a case where the first catalyst temperature is higher than the activation temperature Tcth. This is because the warm-up completion state of the turbine 61 is a state where the first catalyst temperature does not fall below the activation temperature Tcth even if the valve body of the TBV 53 is fully open, and thus the difference between the first catalyst temperature and the activation temperature Tcth increases as the first catalyst temperature becomes increasingly higher than the activation temperature Tcth and the predetermined temperature Tbth for the ECU 10 to determine that the warm-up of the turbine 61 has been completed falls.

In the state that is represented by the curve C3 in FIG. 4, such as the state that is represented by a point P3 on the curve C3, the first catalyst temperature is higher than the activation temperature Tcth, and thus the ECU 10 is capable of determining that the turbine 61 is in the warm-up completion state even if the post-turbine passage exhaust gas temperature is lower than the temperature Tbth1. At this time, the first catalyst temperature has a margin with respect to the activation temperature Tcth although the temperature of the catalyst inflow exhaust gas flowing into the first exhaust gas control catalyst 51 through the turbine 61 can fall below the activation temperature Tcth, and thus the first catalyst temperature becomes unlikely to fall below the activation temperature Tcth.

Once the TBV opening degree in the second warm-up control is controlled as described above, the time transition of the TBV opening degree during the second warm-up control shows the form of, for example, the line L1 in FIG. 3. The turbine inflow exhaust gas flow rate at this time becomes the flow rate that is represented by a line L2 in FIG. 3, and the turbine inflow exhaust gas flow rate becomes the flow rate that is higher than zero and lower than the post-warm-up flow rate Rbct when the operating state of the internal combustion engine 1 remains constant as a result of the second warm-up control. Then, the post-turbine passage exhaust gas temperature is raised by the second warm-up control and the warm-up of the turbine 61 is completed at time t2, when the post-turbine passage exhaust gas temperature reaches the predetermined temperature Tbth.

During the execution of the second warm-up control, the first catalyst temperature is equal to or higher than the activation temperature Tcth and is close to the activation temperature Tcth. The warm-up of the turbine 61 that is as quick as possible is pursued by the turbine inflow exhaust gas flow rate being increased with the warm-up completion state of the first exhaust gas control catalyst 51 maintained as described above. As a result, the turbine inflow exhaust gas flow rate is allowed to quickly reach the post-warm-up flow rate Rbct at which the back pressure of the internal combustion engine 1 can become as low as possible.

Figure 5:
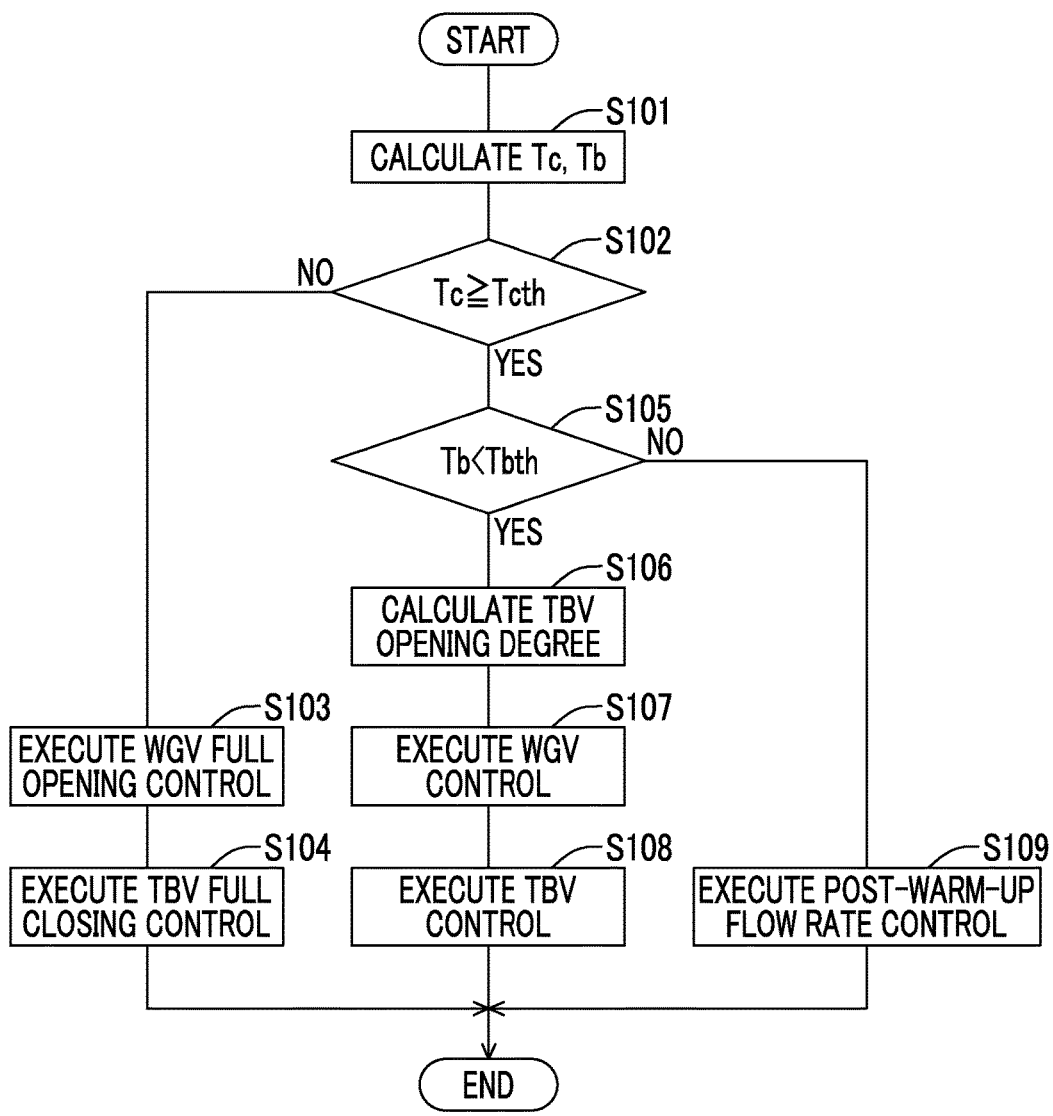
FIG. 5 is a flowchart illustrating a control flow executed in a warm-up system for an exhaust gas apparatus according to Example 1.

A control flow that is executed by the ECU 10 as the warm-up system for an exhaust gas apparatus will be described below based on FIG. 5. FIG. 5 is a flowchart illustrating the control flow. In this example, this flow is repeatedly executed by the ECU 10 at a predetermined calculation cycle while the internal combustion engine 1 is in operation. In principle, this flow is a control flow that is executed by the ECU 10 in a case where the turbocharging request is yet to be established.

In this flow, the first catalyst temperature Tc and the post-turbine passage exhaust gas temperature Tb are calculated first in S101. In S101, the first catalyst temperature Tc is calculated based on the output signal from the first temperature sensor 55.

The post-turbine passage exhaust gas temperature Tb is affected by, for example, the flow rate and the temperature of the exhaust gas flowing into the turbine 61, the heat capacity of the turbine 61, the temperature of the exhaust gas passage 5 in the turbine 61 (such as a scroll), a turbine blade in the turbine 61 touched by the exhaust gas, or the like (hereinafter, referred to as a "turbine temperature" in some cases), and the rotation speed of the turbine. In S101, the post-turbine passage exhaust gas temperature Tb can be calculated based on the parameters related to the post-turbine passage exhaust gas temperature Tb. The post-turbine passage exhaust gas temperature Tb may be calculated from only those of the parameters that have a larger effect than the others on the post-turbine passage exhaust gas temperature Tb (such as the temperature of the exhaust gas flowing into the turbine 61 and the turbine temperature). Alternatively, the temperature of the exhaust gas that flows through the section of the turbine side exhaust gas passage 5a which is provided downstream of the turbine 61 may be measured for that temperature to be calculated as the post-turbine passage exhaust gas temperature Tb.

In S102, the ECU 10 determines whether or not the first catalyst temperature Tc calculated in S101 is equal to or higher than the activation temperature Tcth of the first exhaust gas control catalyst 51. The activation temperature Tcth is stored in advance in a ROM of the ECU 10. The activation temperature Tcth may be a temperature reflecting a predetermined variation. In a case where a positive determination has been made in S102, the ECU 10 allows the processing to proceed to S105. In a case where a negative determination has been made in S102, the ECU 10 allows the processing to proceed to S103.

In the case where the negative determination has been made in S102, which is a case where the warm-up of the first exhaust gas control catalyst 51 is yet to be completed, control for fully opening the valve body of the WGV 54 is executed in S103. Then, control for fully closing the valve body of the TBV 53 is executed in S104. In other words, the first warm-up control is executed in S103 and S104. As a result, the turbine inflow exhaust gas flow rate is controlled such that it reaches zero, and the warm-up of the first exhaust gas control catalyst 51 can be completed relatively early. After the processing in S104, the execution of this flow is terminated.

In the case where the positive determination has been made in S102, which is a case where the warm-up of the first exhaust gas control catalyst 51 is already completed, the ECU 10 determines in S105 whether or not the post-turbine passage exhaust gas temperature Tb calculated in S101 is lower than the predetermined temperature Tbth. The predetermined temperature Tbth is a temperature for the ECU 10 to determine that the warm-up of the turbine 61 is already completed and is defined as, for example, the post-turbine passage exhaust gas temperature that is represented by the curve C3 in FIG. 4. The relationships of the TBV opening degree with the first catalyst temperature and the post-turbine passage exhaust gas temperature, which are illustrated in FIG. 4, are stored in advance in the ROM of the ECU 10 in the form of a map or a function. In S105, the predetermined temperature Tbth corresponding to the first catalyst temperature Tc calculated in S101 is calculated from the map or the function and the ECU 10 determines whether or not the post-turbine passage exhaust gas temperature Tb calculated in S101 is lower than the predetermined temperature Tbth. In other words, the ECU 10 determines in S105 whether or not the warm-up of the turbine 61 is already completed. In a case where a positive determination has been made in S105, the ECU 10 allows the processing to proceed to S106. In a case where a negative determination has been made in S105, the ECU 10 allows the processing to proceed to S109.

In the case where the positive determination has been made in S105, which is a case where the warm-up of the first exhaust gas control catalyst 51 is already completed and the warm-up of the turbine 61 is yet to be completed, the TBV opening degree is calculated in S106. In S106, the TBV opening degree is calculated based on the first catalyst temperature Tc and the post-turbine passage exhaust gas temperature Tb calculated in S101 and the map or the function representing the relationships illustrated in FIG. 4. As a result, the TBV opening degree at which falling of the first catalyst temperature below the activation temperature Tcth can be suppressed and the turbine 61 can still be warmed-up as quickly as possible is calculated.

The WGV 54 is controlled in S107. As described above, the valve body of the WGV 54 is fully opened in principle when the second warm-up control is executed. Accordingly, control for fully opening the valve body of the WGV 54 is executed in S107. In this example, however, the processing in S107 is not limited to the control for fully opening the valve body of the WGV 54, and the WGV opening degree may be changed through the processing in S107. In this case, the relationships of the TBV opening degree with the first catalyst temperature and the post-turbine passage exhaust gas temperature illustrated in FIG. 4 are defined in view of the WGV opening degree.

In S108, processing for controlling the valve body of the TBV 53 such that it reaches the TBV opening degree calculated in S106 is executed. As a result, the turbine inflow exhaust gas flow rate is controlled such that it reaches the flow rate that is higher than zero and lower than the post-warm-up flow rate when the operating state of the internal combustion engine 1 remains constant. In other words, the second warm-up control is executed in S107 and S108. After the processing in S108, the execution of this flow is terminated.

In the case where the negative determination has been made in S105, which is a case where the warm-up of the first exhaust gas control catalyst 51 and the turbine 61 is already completed, post-warm-up flow rate control is executed in S109, which is for the turbine inflow exhaust gas flow rate to reach the post-warm-up flow rate depending on the operation state of the internal combustion engine 1. Since this control flow is, in principle, executed in the case where the turbocharging request is yet to be established as described above, the control that is executed in S109 is for the turbine inflow exhaust gas flow rate to reach the post-warm-up flow rate depending on the operation state of the internal combustion engine 1 in the case where the turbocharging request is yet to be established. The valve bodies of the TBV 53 and the WGV 54, for example, are fully opened during this post-warm-up flow rate control for the back pressure of the internal combustion engine 1 to become as low as possible. After the processing in S109, the execution of this flow is terminated.

In principle, the execution of this flow is stopped in a case where the turbocharging request is established during the execution of this flow. This is to respond to the turbocharging request. Alternatively, the execution of this flow may continue until the completion of the warm-up of the first exhaust gas control catalyst 51 and the turbine 61 with priority given to the warm-up and the turbocharging request may be responded to after the completion of the warm-up. In a case where the ECU 10 responds to the turbocharging request, the TBV opening degree and the WGV opening degree may be controlled separately from this flow such that the intake manifold pressure reaches the required intake manifold pressure calculated based on the accelerator operation amount or the like. In this case, the valve body of the TBV 53, for example, is fully opened and the WGV opening degree reaches an opening degree depending on the required intake manifold pressure.

By the warm-up system for an exhaust gas apparatus executing the control flow described above, the warm-up of the turbine 61 can be completed as quickly as possible and falling of the first catalyst temperature below the activation temperature Tcth after activation of the first exhaust gas control catalyst 51 can still be suppressed (the warm-up completion state of the first exhaust gas control catalyst 51 can still be maintained). Accordingly, a decline in the exhaust gas control capacity of the first exhaust gas control catalyst 51 can be suitably suppressed.

MODIFICATION EXAMPLE

Figure 6:
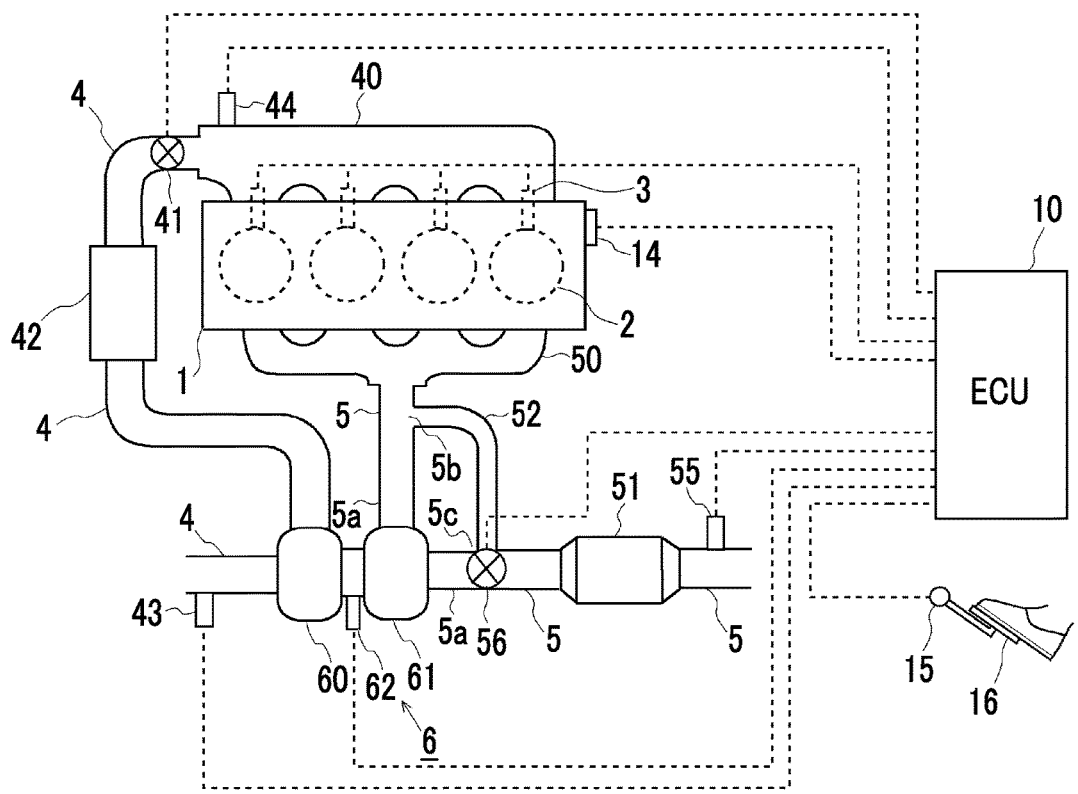
FIG. 6 is a diagram illustrating a schematic configuration of an internal combustion engine according to a modification example of Example 1 and a schematic configuration of an intake and exhaust system of the internal combustion engine.

Hereinafter, a modification example of the first example described above will be described based on FIGS. 6 to 9. FIG. 6 is a diagram illustrating a schematic configuration of the internal combustion engine 1 according to this modification example and a schematic configuration of the intake and exhaust system of the internal combustion engine 1. As illustrated in FIG. 6, the TBV 53 and the WGV 54 are not disposed in an exhaust gas apparatus according to this modification example. In the exhaust gas apparatus, a distribution valve 56 is disposed in the merging portion 5c where the turbine side exhaust gas passage 5a and the bypass passage 52 merge with each other. A detailed description of substantially the same configuration and substantially the same control processing as in the first example described above will be omitted.

Figure 7A:
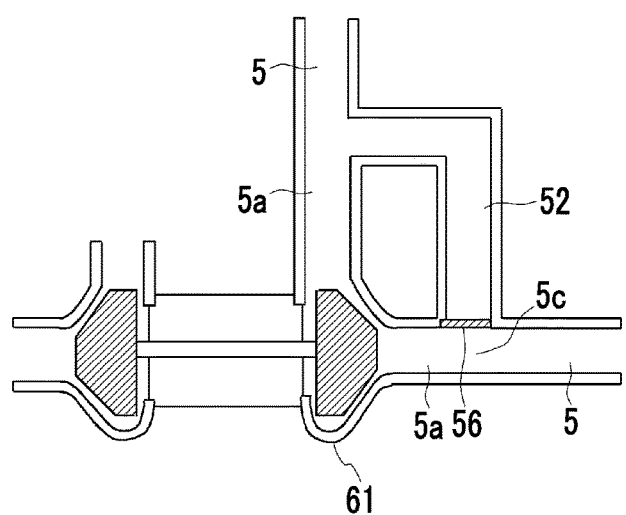
FIG. 7A is a diagram illustrating a state where a distribution valve according to the modification example of Example 1 is controlled for exhaust gas to be guided into a turbine side exhaust gas passage.
Figure 7B:
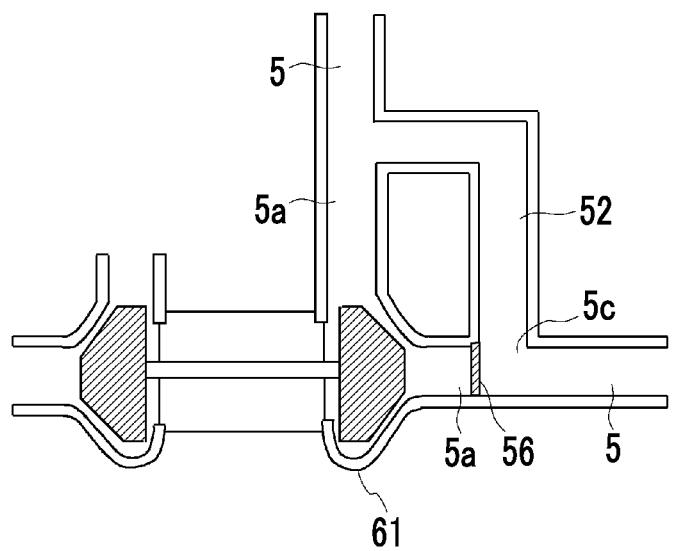
FIG. 7B is a diagram illustrating a state where the distribution valve according to the modification example of Example 1 is controlled for exhaust gas to be guided into a bypass passage.
Figure 7C:
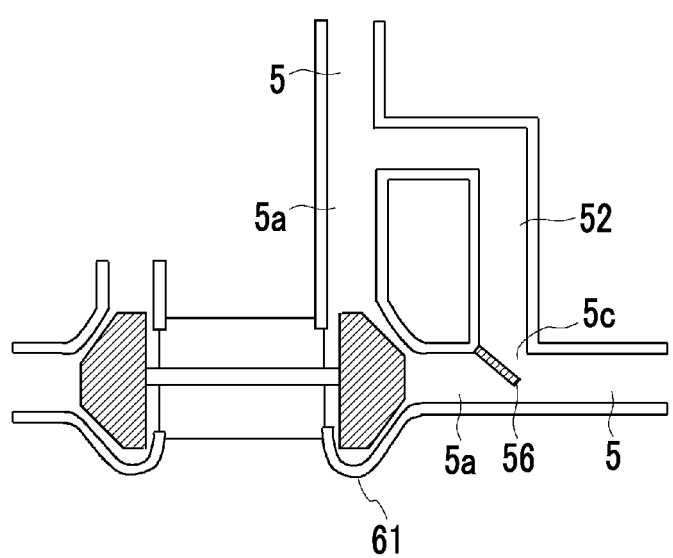
FIG. 7C is a diagram illustrating a state where the distribution valve according to the modification example of Example 1 is controlled for exhaust gas to be guided into both the turbine side exhaust gas passage and the bypass passage.

The distribution valve 56 that the exhaust gas apparatus according to this modification example is provided with is a distribution valve guiding the exhaust gas into the turbine side exhaust gas passage 5a, the bypass passage 52, or both. The distribution valve 56 is capable of changing the ratio between the exhaust gas flow rate in the turbine side exhaust gas passage 5a and the exhaust gas flow rate in the bypass passage 52. The distribution valve 56 will be described below based on FIGS. 7A to 7C, which show the function of the distribution valve 56. FIG. 7A is a diagram illustrating a state where the distribution valve 56 is controlled for exhaust gas to be guided into the turbine side exhaust gas passage 5a. In this state, the bypass passage 52 has a degree of opening (hereinafter, referred to as a "bypass passage opening degree" in some cases) of 0(%) because of the distribution valve 56. FIG. 7B is a diagram illustrating a state where the distribution valve 56 is controlled for exhaust gas to be guided into the bypass passage 52. In this state, the turbine side exhaust gas passage 5a has a degree of opening (hereinafter, referred to as a "turbine side exhaust gas passage opening degree" in some cases) of 0(%) because of the distribution valve 56. The distribution valve 56 is operated such that the sum of the turbine side exhaust gas passage opening degree and the bypass passage opening degree is 100(%). Accordingly, the turbine side exhaust gas passage opening degree reaches 100(%) when the bypass passage opening degree is 0(%), and the bypass passage opening degree reaches 100(%) when the turbine side exhaust gas passage opening degree is 0(%). FIG. 7C is a diagram illustrating a state where the distribution valve 56 is controlled for exhaust gas to be guided into both the turbine side exhaust gas passage 5a and the bypass passage 52. In this state, each of the turbine side exhaust gas passage opening degree and the bypass passage opening degree is, for example, 50(%) because of the distribution valve 56. The distribution valve 56 is capable of changing the ratio between the exhaust gas flow rate in the turbine side exhaust gas passage 5a and the exhaust gas flow rate in the bypass passage 52 in this manner. The distribution valve 56 may be disposed in the branching portion 5b, where the exhaust gas passage 5 branches into the turbine side exhaust gas passage 5a and the bypass passage 52. In this modification example, the distribution valve 56 is an example of the adjustment unit.

FIG. 8 is a diagram illustrating time transitions of the first catalyst temperature, the post-turbine passage exhaust gas temperature, the turbine side exhaust gas passage opening degree, the bypass passage opening degree, and the turbine inflow exhaust gas flow rate. FIG. 8 is a diagram corresponding to FIG. 3 for the first example described above. In FIG. 8, the turbine side exhaust gas passage opening degree and the bypass passage opening degree are illustrated in place of the TBV opening degree and the WGV opening degree.

As illustrated in FIG. 8, the turbine side exhaust gas passage opening degree begins to increase front 0(%) and the bypass passage opening degree begins to decrease from 100(%) at time t1. At this time, the turbine side exhaust gas passage opening degree may be controlled, such that it reaches an opening degree at which the warm-up of the turbine 61 can be completed as quickly as possible, with the warm-up completion state of the first exhaust gas control catalyst 51 maintained, with relationships of the first catalyst temperature and the post-turbine passage exhaust gas temperature with the turbine side exhaust gas passage opening degree according to this modification example in which the distribution valve 56 is disposed acquired in advance as in the case of the relationships of the first catalyst temperature and the post-turbine passage exhaust gas temperature with the TBV opening degree illustrated in FIG. 4. In this case, the turbine side exhaust gas passage opening degree is controlled such that it reaches the opening degree that is represented by a line L11 which is illustrated in FIG. 8 and the bypass passage opening degree as controlled such that it reaches the opening degree that is represented by a line L12 which is illustrated in FIG. 8. As a result, the first catalyst temperature is equal to or higher than the activation temperature Tcth and is close to the activation temperature Tcth during the execution of the second warm-up control as illustrated in FIG. 8, and thus the turbine 61 can be warmed-up as quickly as possible with falling of the first catalyst temperature below the activation temperature Tcth suppressed.

Figure 9:
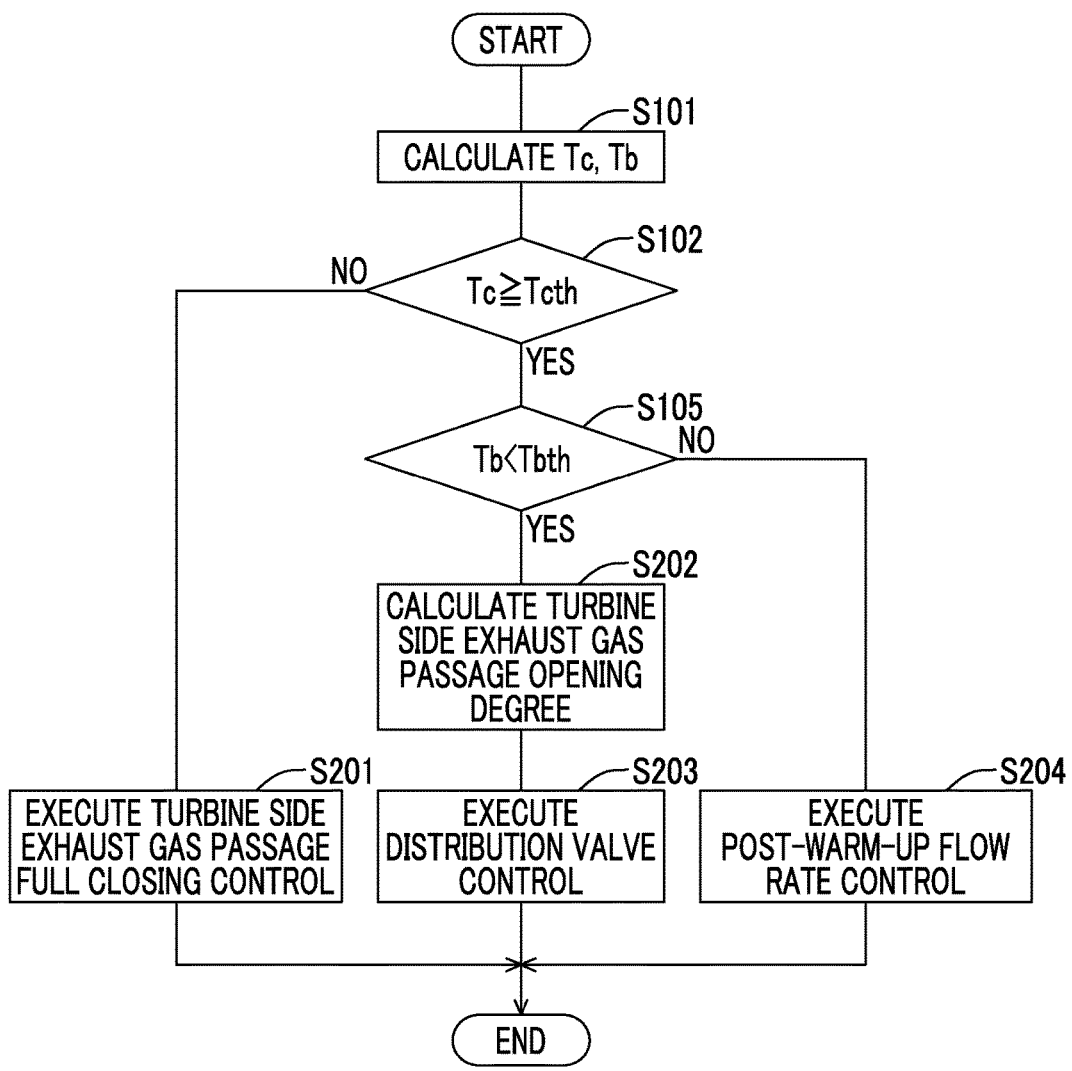
FIG. 9 is a flowchart illustrating a control flow executed in a warm-up system for an exhaust gas apparatus according to the modification example of Example 1.

A control flow that is executed by the ECU 10 according to this modification example will be described below based on FIG. 9. FIG. 9 is a flowchart illustrating the control flow. In this modification example, this flow is repeatedly executed by the ECU 10 at a predetermined calculation cycle while the internal combustion engine 1 is in operation. In principle, this flow is a control flow that is executed by the ECU 10 in a case where the turbocharging request is yet to be established.

In the flow that is illustrated in FIG. 9, processing for controlling the distribution valve 56 for the turbine side exhaust gas passage opening degree to reach 0(%) (that is, for the turbine side exhaust gas passage to be fully closed) is executed in S201 in the case where the negative determination has been made in S102. As a result of the processing in S201, the turbine inflow exhaust gas flow rate is controlled such that it reaches zero and the exhaust gas flows into the first exhaust gas control catalyst 51 through the bypass passage 52. Accordingly, the first warm-up control is executed at this time. After the processing in S201, the execution of this flow is terminated.

In the flow that is illustrated in FIG. 9, the turbine side exhaust gas passage opening degree is calculated in S202 in the case where the positive determination has been made in S105. The relationships of the first catalyst temperature and the post-turbine passage exhaust gas temperature with the turbine side exhaust gas passage opening degree according to this modification example in which the distribution valve 56 is disposed, which correspond to the relationships of the first catalyst temperature and the post-turbine passage exhaust gas temperature with the TBV opening degree illustrated in FIG. 4, are stored in advance in the ROM of the ECU 10 in the form of a map or a function. In S202, the turbine side exhaust gas passage opening degree is calculated based on the first catalyst temperature Tc and the post-turbine passage exhaust gas temperature Tb calculated in S101 and this map or function. As a result, the turbine side exhaust gas passage opening degree at which falling of the first catalyst temperature below the activation temperature Tcth can be suppressed and the turbine 61 cast still be warmed-up as quickly as possible is calculated. The bypass passage opening degree at this time is uniquely determined in accordance with the turbine side exhaust gas passage opening degree.

After the processing in S202, processing for controlling the distribution valve 56 for the turbine side exhaust gas passage opening degree to reach the opening degree calculated in S202 is executed in S203. As a result, the turbine inflow exhaust gas flow rate is controlled such that it reaches the flow rate that is higher than zero and lower than the post-warm-up flow rate when the operating state of the internal combustion engine 1 remains constant. In other words, the second warm-up control is executed. After the processing in S203, the execution of this flow is terminated.

In the case where the negative determination has been made in S105 of the flow that is illustrated in FIG. 9, the post-warm-up flow rate control is executed in S204, which is for the turbine inflow exhaust gas flow rate to reach the post-warm-up flow rate depending on the operation state of the internal combustion engine 1 in the case where the turbocharging request is yet to be established. During the post-warm-up flow rate control, the distribution valve 56 is controlled such that the back pressure of the internal combustion engine 1 becomes as low as possible. After the processing in S204, the execution of this flow is terminated.

By the ECU 10 according to this modification example executing the control flow described above, the warm-up of the turbine 61 can be completed as quickly as possible and falling of the first catalyst temperature below the activation temperature Tcth after activation of the first exhaust gas control catalyst 51 can still be suppressed (the warm-up completion state of the first exhaust gas control catalyst 51 can still be maintained). Accordingly, a decline in the exhaust gas control capacity of the first exhaust gas control catalyst 51 can be suitably suppressed.

EXAMPLE 2

Figure 10:
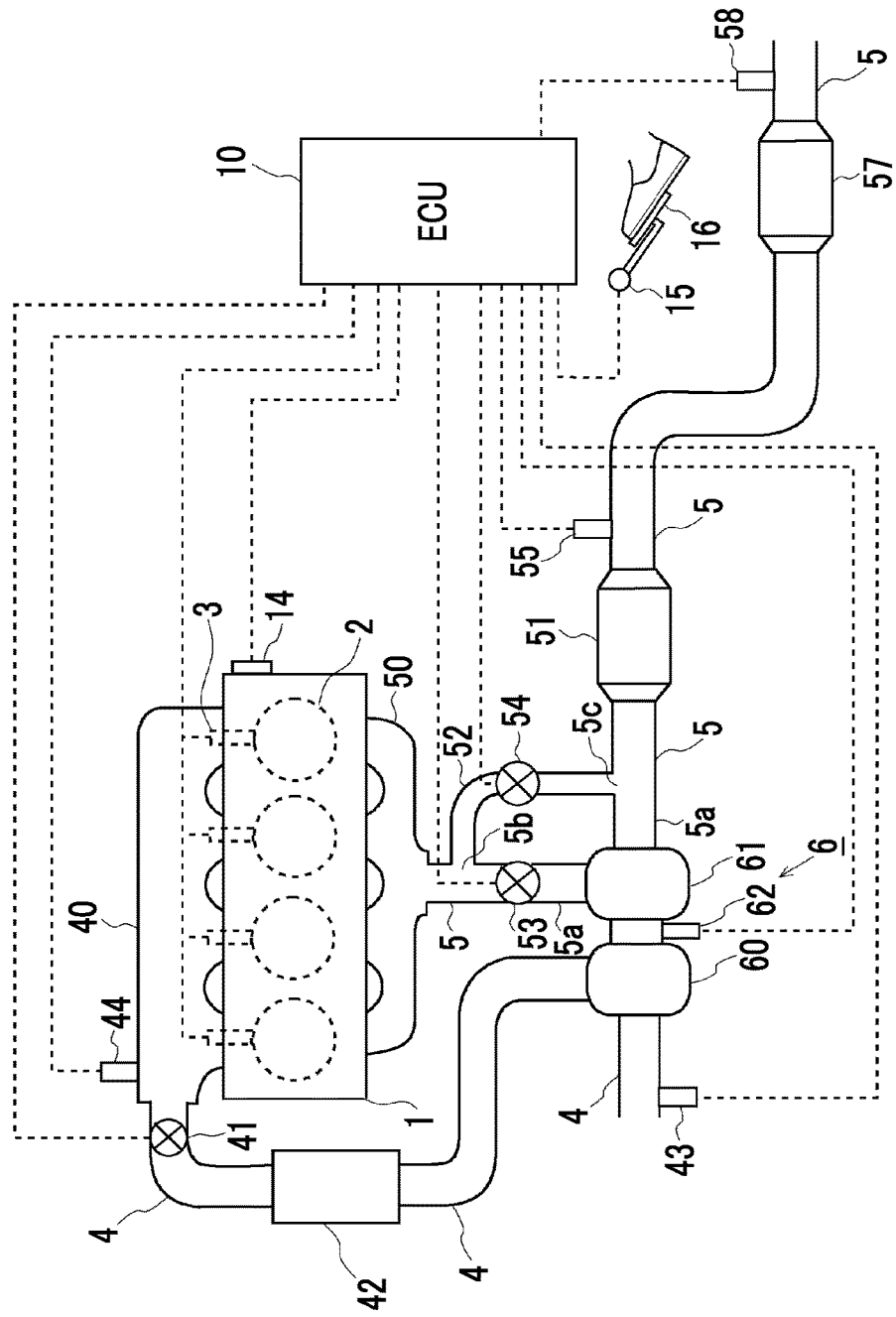
FIG. 10 is a diagram illustrating a schematic configuration of an internal combustion engine according to Example 2 and a schematic configuration of an intake and exhaust system of the internal combustion engine.

Hereinafter, a second example will be described based on FIGS. 10 to 12. FIG. 10 is a diagram illustrating a schematic configuration of the internal combustion engine 1 according to this example and a schematic configuration of the intake and exhaust system of the internal combustion engine 1. In an exhaust gas apparatus according to this example, a second exhaust gas control catalyst 57 is disposed on the exhaust gas passage 5 and provided downstream of the first exhaust gas control catalyst 51 as illustrated in FIG. 10. In addition, a second temperature sensor 58 is disposed on the exhaust gas passage 5 and provided downstream of the second exhaust gas control catalyst 57. A detailed description of substantially the same configuration and substantially the same control processing as in the first example described above will be omitted.

In the exhaust gas apparatus according to this example, the exhaust gas is controlled by the first exhaust gas control catalyst 51 and the second exhaust gas control catalyst 37. The ECU 10 estimates the temperature of the second exhaust gas control catalyst 57 (hereinafter, referred to as a "second catalyst temperature" in some cases) based on the value that is output by the second temperature sensor 58.

In a case where the ECU 10 according to this example performs the second warm-up control described above, the ECU 10 performs the warm-up of the turbine 61 by controlling the turbine inflow exhaust gas flow rate such that the turbine inflow exhaust gas flow rate reaches the flow rate higher than zero and lower than the post-warm-up flow rate when the operating state of the internal combustion engine 1 remains constant as in the first example described above. The post-warm-up flow rate according to this example is the turbine inflow exhaust gas flow rate that follows the completion of warm-up of the second exhaust gas control catalyst 57 as well as that of the first exhaust gas control catalyst 51 and the turbine 61. The post-warm-up flow rate according to this example is determined in accordance with the operation state of the internal combustion engine 1.

It can be said that the exhaust gas control capacity of the exhaust gas apparatus according to this example is insufficient in a case where the warm-up of the second exhaust gas control catalyst 57 is yet to be completed after the completion of the warm-up of the first exhaust gas control catalyst 51 in the exhaust gas apparatus. In this regard, the ECU 10 performs the warm-up of the second exhaust gas control catalyst 57, by controlling the turbine inflow exhaust gas flow rate such that it reaches zero, in a case where the warm-up of the second exhaust gas control catalyst 57 is yet to be completed with the warm-up of the first exhaust gas control catalyst 51 and the turbine 61 already completed. This control by which the ECU 10 performs the warm-up of the second exhaust gas control catalyst 57 as described above will be referred to as "third warm-up control". The third warm-up control will be described below based on FIG. 11. The ECU 10 functions as third warm-up control means by performing the third warm-up control.

Figure 11:
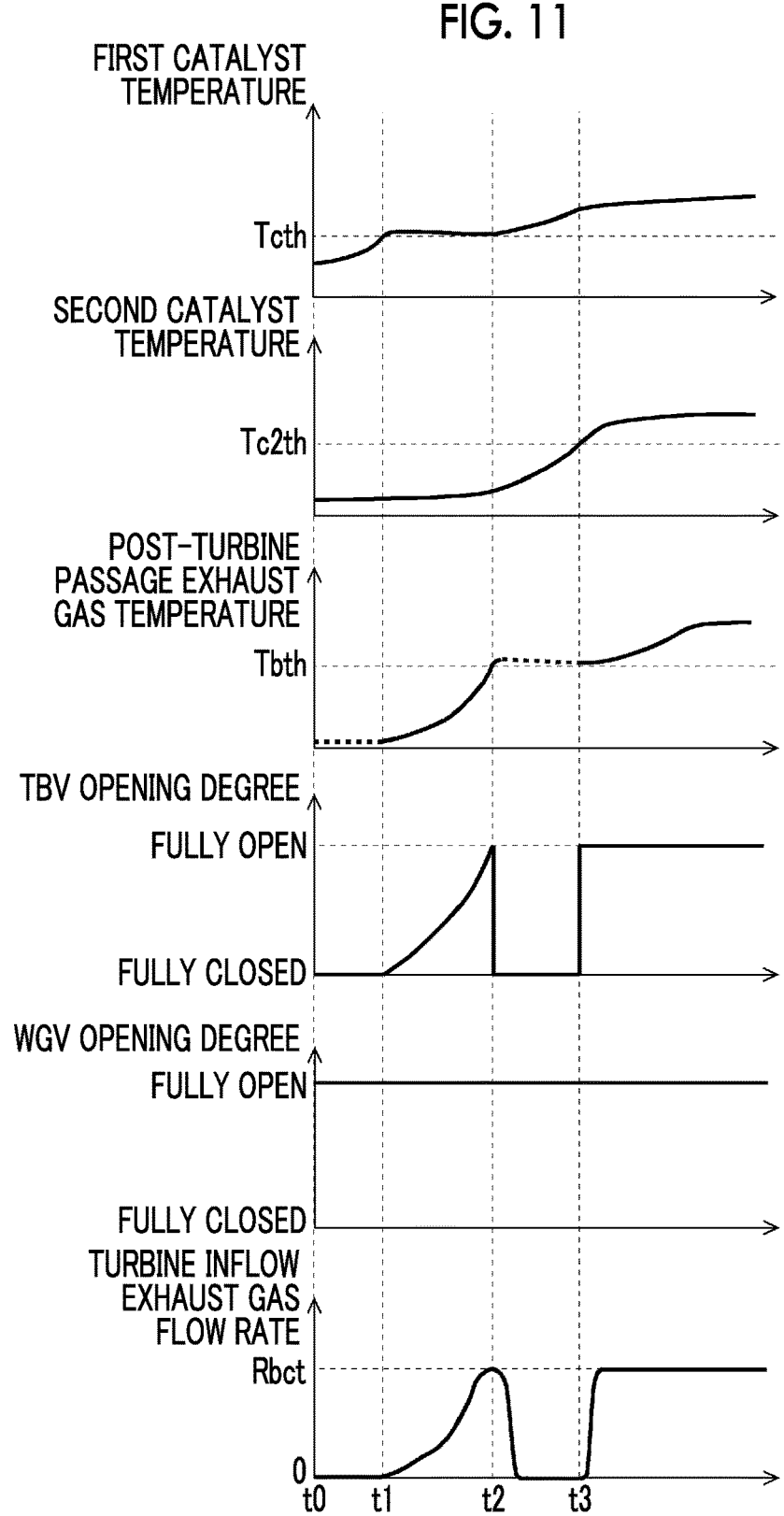
FIG. 11 is a diagram illustrating time transitions of a first catalyst temperature, a second catalyst temperature, a post-turbine passage exhaust gas temperature, a TBV opening degree, a WGV opening degree, and a turbine inflow exhaust gas flow rate according to Example 2.
Figure 12:
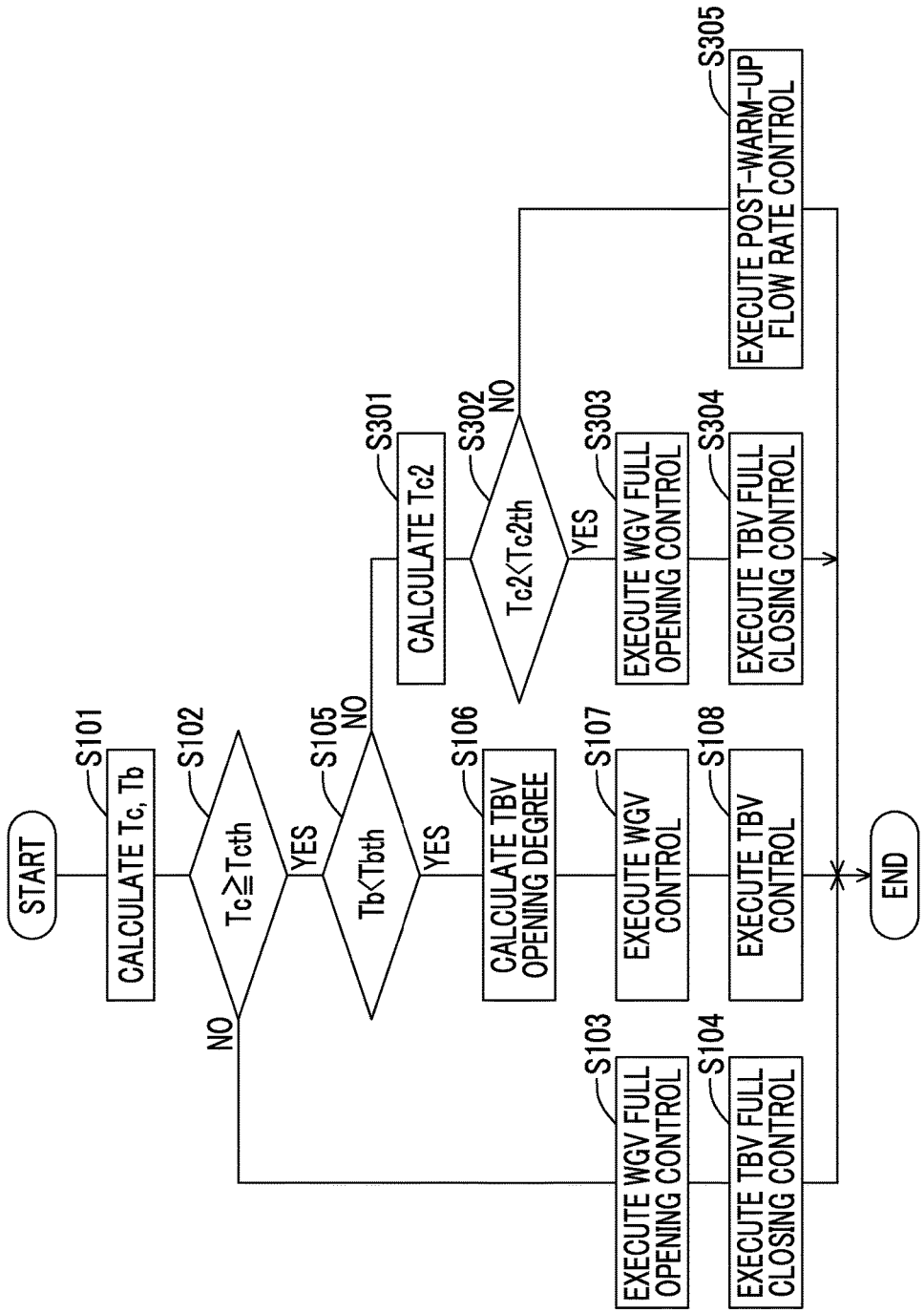
FIG. 12 is a flowchart illustrating a control flow executed in a warm-up system for an exhaust gas apparatus according to Example 2.

FIG. 11 is a diagram illustrating time transitions of the first catalyst temperature, the second catalyst temperature, the post-turbine passage exhaust gas temperature, the TBV opening degree, the WGV opening degree, and the turbine inflow exhaust gas flow rate. According to FIG. 11, the first warm-up control is executed from time t0 to time t1 and the second warm-up control is executed from time t1 to tune t2 as in FIG. 3. At time t2, the second catalyst temperature is lower than an activation temperature Tc2th of the second exhaust gas control catalyst 57. In other words, the warm-up of the second exhaust gas control catalyst 57 is yet to be completed. At this time, the post-turbine passage exhaust gas temperature is equal to or higher than the predetermined temperature Tbth and the warm-up of the turbine 61 is already completed. According to FIG. 11, the ECU 10 fully closes the valve body of the TBV 53 by controlling it at time t2. As a result, the turbine inflow exhaust gas flow rate reaches approximately zero. In other words, the third warm-up control is initiated.

The turbine inflow exhaust gas flow rate reaches approximately zero once the third warm-up control is initiated as described above. Accordingly, a decline in the thermal energy of the exhaust gas that is attributable to heat dissipation toward the turbine 61 with a high heat capacity is suppressed. As a result, the first catalyst temperature and the second catalyst temperature become likely to rise, and the second catalyst temperature in particular, rises relatively early after time t2. In other words, the warm-up of the second exhaust gas control catalyst 57 by the third warm-up control can be completed relatively early.

During the third warm-up control no exhaust gas passes through the turbine 61. Accordingly, the turbine temperature tends to fall. Still, the turbine 61 has a high heat capacity, and thus the degree of the decline in the turbine temperature becomes relatively low (this is shown by a dashed line in FIG. 11 in view of the turbine temperature during the third warm-up control). As described above with reference to FIG. 4, the predetermined temperature Tbth decreases as the first catalyst temperature becomes increasingly higher than the activation temperature Tcth. As a result of the execution of the third warm-up control, the first catalyst temperature becomes likely to rise. The third warm-up control is executed after the warm-up of the turbine 61 is completed as described above. Accordingly, the warm-up completion state of the turbine 61 tends to be maintained in substance even during the execution of the third warm-up control. As a result, the warmed-up first exhaust gas control catalyst 51 is capable of maintaining its active state even if the turbocharging request is established during the execution of the third warm-up control and the turbine inflow exhaust gas flow rate reaches a flow rate responding to the request in order to respond to the turbocharging request.

The warm-up of the second exhaust gas control catalyst 57 is completed at time t3, when the second catalyst temperature reaches the activation temperature Tc2th. Once the warm-up of the second exhaust gas control catalyst 57 is completed, the valve body of the TBV 53 is fully opened and the turbine inflow exhaust gas flow rate reaches the post-warm-up flow rate Rbct.

A control flow that the ECU 10 according to this example executes when the ECU 10 performs the third warm-up control will be described below based on FIG. 12. FIG. 12 is a flowchart illustrating the control flow. In this example, this flow is repeatedly executed by the ECU 10 at a predetermined calculation cycle while the internal combustion engine 1 is in operation. In principle, this flow is a control flow that is executed by the ECU 10 in a case where the turbocharging request is yet to be established.

In this flow, the first warm-up control is executed in the case where the negative determination has been made in S102 and the second warm-up control is executed in the case where the positive determination has been made in S105 as in the flow that is illustrated in FIG. 5. In the case where the negative determination has been made in S105, which is the case where the warm-up of the first exhaust gas control catalyst 51 and the turbine 61 is already completed, a second catalyst temperature Tc2 is calculated in S301. In S301, the second catalyst temperature Tc2 is calculated based on the output signal from the second temperature sensor 58.

In S302, the ECU 10 determines whether or not the second catalyst temperature Tc2 calculated in S301 is lower than the activation temperature Tc2th of the second exhaust gas control catalyst 57. The activation temperature Tc2th is stored in advance in the ROM of the ECU 10. The activation temperature Tc2th may be a temperature reflecting a predetermined variation. In a case where a positive determination has been made in S302, the ECU 10 allows the processing to proceed to S303. In a case where a negative determination has been made in S302, the ECU 10 allows the processing to proceed to S305.

In the case where the positive determination has been made in S302, which is the case where the warm-up of the second exhaust gas control catalyst 57 is yet to be completed, control for fully opening the valve body of the WGV 54 is executed in S303. Then, control for fully closing the valve body of the TBV 53 is executed in S304. As a result, the turbine inflow exhaust gas flow rate is controlled such that it reaches zero. In other words, the third warm-up control is executed in S303 and S304. After the processing in S304, the execution of this flow is terminated.

In the case where the negative determination has been made in S302, which is the case where the warm-up of the second exhaust gas control catalyst 57 as well as that of the first exhaust gas control catalyst 51 and the turbine 61 is already completed, the post-warm-up flow rate control is executed in S305, which is for the turbine inflow exhaust gas flow rate to reach the post-warm-up flow rate depending on the operation state of the internal combustion engine 1 in the case where the turbocharging request is yet to be established. As described above, the post-warm-up flow rate according to this example is the turbine inflow exhaust gas flow rate that follows the completion of warm-up of the second exhaust gas control catalyst 57 as well as that of the first exhaust gas control catalyst 51 and the turbine 61. Accordingly, the valve bodies of the TBV 53 and the WGV 54, for example, are fully opened during this post-warm-up flow rate control for the back pressure of the internal combustion engine 1 to become as low as possible. After the processing in S305, the execution of this flow is terminated.

In principle, the execution of this flow is stopped in a case where the turbocharging request is established during the execution of this flow. This is to respond to the turbocharging request. Alternatively, the execution of this flow may continue until the completion of the warm-up of the first exhaust gas control catalyst 51, the turbine 61, and the second exhaust gas control catalyst 57 with priority given to the warm-up and the turbocharging request may be responded to after the completion of the warm-up. Even if the turbocharging request is established during the execution of the third warm-up control and the turbine inflow exhaust gas flow rate reaches the flow rate responding to the request in order to respond to the turbocharging request, the temperature of the warmed-up first exhaust gas control catalyst 51 is unlikely to fall below the activation temperature for the reason described above.

By the ECU 10 according to this example executing the control flow described above, the warm-up of the second exhaust gas control catalyst 57 by the third warm-up control can be completed relatively early. As a result, a decline in the exhaust gas control capacity of the exhaust gas control catalyst can be suppressed.

The distribution valve 56 according to the modification example of the first example described above may be disposed in place of the TBV 53 and the WGV 54 in this example. In this case, the ECU 10 reduces the turbine side exhaust gas passage opening degree to 0(%) in the case where the warm-up of the turbine 61 is already completed and the warm-up of the second exhaust gas control catalyst 57 is yet to be completed.

An aspect relates to a warm-up system for an exhaust gas apparatus including an exhaust gas apparatus including a turbocharger, a first exhaust gas control catalyst, a bypass passage and an adjustment unit. The turbocharger is provided with a turbine, and is disposed on an exhaust gas passage of an internal combustion engine. The first exhaust gas control catalyst is disposed on the exhaust gas passage disposed downstream of the turbine. The bypass passage branches from the exhaust gas passage upstream of the turbine, bypasses the turbine, and merges with the exhaust gas passage disposed upstream of the first exhaust gas control catalyst. The adjustment unit is configured to adjust a turbine inflow exhaust gas flow rate, which is a flow rate of exhaust gas flowing into the turbine, by changing a ratio between the turbine inflow exhaust gas flow rate and a flow rate of exhaust gas flowing into the bypass passage. The warm-up system further includes an electronic control unit configured to control the turbine inflow exhaust gas flow rate by using the adjustment unit, such that the turbine inflow exhaust gas flow rate reaches a post-warm-up flow rate which depends on operation states of the internal combustion engine, after the first exhaust gas control catalyst and the turbine are warmed. The electronic control unit is configured to perform a first warm-up control which warms the first exhaust gas control catalyst by controlling the turbine inflow exhaust gas flow rate, by using the adjustment unit, to reach zero, when a temperature of the first exhaust gas control catalyst is lower than an activation temperature of the first exhaust gas control catalyst. The electronic control unit is configured to perform a second warm-up control which warms the turbine by controlling the turbine inflow exhaust gas flow rate, by using the adjustment unit, to reach a flow rate higher than zero and lower than the post-warm-up flow rate when an operating state of the internal combustion engine remains constant, such that a warmed state of the first exhaust gas control catalyst is maintained after the first exhaust gas control catalyst is warmed by the first warm-up control.

The exhaust gas passage of the exhaust gas apparatus has a branching portion branching into the bypass passage from the middle section of the exhaust gas passage that is provided upstream of the turbine and a merging portion where the bypass passage merges with the exhaust gas passage. Hereinafter, the section of the exhaust gas passage that reaches the merging portion through the turbine from the branching portion will be referred to as a "turbine side exhaust gas passage". The adjustment unit of the exhaust gas apparatus changes the ratio between the turbine inflow exhaust gas flow rate and the flow rate of the exhaust gas flowing into the bypass passage by, for example, changing a passage sectional area in the turbine side exhaust gas passage and, as such, the adjustment unit is an adjustment valve adjusting the turbine inflow exhaust gas flow rate. Once the turbine inflow exhaust gas flow rate is changed by the adjustment valve changing the passage sectional area in the turbine side exhaust gas passage, the flow rate of the exhaust gas flowing into the bypass passage is changed in conjunction with the change of the turbine inflow exhaust gas flow rate. The adjustment unit is an adjustment valve adjusting the turbine inflow exhaust gas flow rate by changing the ratio between the turbine inflow exhaust gas flow rate and the flow rate of the exhaust gas flowing into the bypass passage by changing the passage sectional area in the turbine side exhaust gas passage and a passage sectional area in the bypass passage respectively. The adjustment unit is a distribution valve disposed in the branching portion or the merging portion and guiding the exhaust gas into the turbine side exhaust gas passage, the bypass passage, or both. A known configuration allowing the turbine inflow exhaust gas flow rate to vary with approximately zero included therein is used as the adjustment unit.

In the warm-up system for the exhaust gas apparatus, the exhaust gas flows into the first exhaust gas control catalyst through the bypass passage once the turbine inflow exhaust gas flow rate is controlled by the electronic control unit such that the turbine inflow exhaust gas flow rate reaches zero. As a result, a decline in the thermal energy of the exhaust gas due to heat dissipation toward the turbine with a high heat capacity can be suppressed, and thus the warm-up of the first exhaust gas control catalyst can be completed relatively early. In the warm-up system, the exhaust gas is introduced into the turbine by the electronic control unit once the warm-up of the first exhaust gas control catalyst is completed. In a case where the turbine and the turbine side exhaust gas passage remain in a cold state at this time, flowing of the exhaust gas into the first exhaust gas control catalyst through the turbine result in a decrease its the thermal energy of the exhaust gas flowing into the first exhaust gas control catalyst due to heat dissipation toward the turbine and cause the temperature of the first exhaust gas control catalyst warmed up based on the flow rate of the exhaust gas to fall below the activation temperature of the first exhaust gas control catalyst.

The flow rate and the temperature of the catalyst inflow exhaust gas that flows into the first exhaust gas control catalyst through the turbine, the flow rate and the temperature of the catalyst inflow exhaust gas that flows into the first exhaust gas control catalyst through the bypass passage, affect the temperature of the first exhaust gas control catalyst. Accordingly, the temperature of the first exhaust gas control catalyst is likely to fall when, for example, the catalyst inflow exhaust gas flowing into the first exhaust gas control catalyst through the turbine has a low temperature. At this time, the temperature of the first exhaust gas control catalyst becomes likely to fall as the flow rate of the catalyst inflow exhaust gas flowing into the first exhaust gas control catalyst through the turbine increases (the flow rate becoming equal to the turbine inflow exhaust gas flow rate).

The electronic control unit that the warm-up system for the exhaust gas apparatus is provided with controls the turbine inflow exhaust gas flow rate by using the adjustment unit, such that the turbine inflow exhaust gas flow rate reaches the flow rate higher than zero and lower than the post-warm-up flow rate when the operating state of the internal combustion engine remains constant, for the warm-up completion state of the first exhaust gas control catalyst to be maintained after the completion of the warm-up of the first exhaust gas control catalyst. The turbine inflow exhaust gas flow rate at this time is lower than the post-warm-up flow rate, and thus flowing of a large amount of the exhaust gas declined in temperature through the turbine into the first exhaust gas control catalyst can be avoided and the warm-up of the turbine can still be performed. As a result, falling of the temperature of the first exhaust gas control catalyst in the warm-up completion state below the activation temperature of the first exhaust gas control catalyst during the warm-up of the turbine can be suppressed. In other words, the first exhaust gas control catalyst is capable of maintaining its active state during the warm-up of the turbine.

A state where the warm-up of the turbine has been completed that is formed by the control of the turbine inflow exhaust gas flow rate described above (hereinafter, referred to as a "turbine warm-up completion state" in some cases) will be described below. The turbine warm-up completion state is defined as a state where the temperature of the turbine has been raised to the extent of being capable of avoiding falling of the temperature of the first exhaust gas control catalyst below the activation temperature of the first exhaust gas control catalyst, that is, to the extent of being capable of maintaining the warm-up completion state of the first exhaust gas control catalyst, even if the turbine inflow exhaust gas flow rate is at the post-warm-up flow rate depending on the operation state of the internal combustion engine when the exhaust gas flows into the first exhaust gas control catalyst through the turbine. Accordingly, in the turbine warm-up completion state, the temperature of the exhaust gas passage in the turbine (such as a scroll), a turbine blade in the turbine touched by the exhaust gas, or the like (hereinafter, referred to as a "turbine temperature" in some cases) tends to be relatively high. Once the turbine inflow exhaust gas flow rate reaches the post-warm-up flow rate in the turbine warm-up completion state, the back pressure of the internal combustion engine can become as low as possible. In other words, the post-warm-up flow rate is defined as the turbine inflow exhaust gas flow rate at which, for example, the back pressure of the internal combustion engine can became as low as possible.

According to the aspect, the warm-up system for the exhaust gas apparatus is capable of warming the turbine while maintaining the warmed state of the first exhaust gas control catalyst by controlling the turbine inflow exhaust gas flow rate as described above. Accordingly, a decline in the exhaust gas control capacity of the exhaust gas control catalyst can be suppressed.

In addition, in the aspect, the electronic control unit controls the turbine inflow exhaust gas flow rate based on the temperature of the first exhaust gas control catalyst and a post-turbine passage exhaust gas temperature, which is a temperature of the exhaust gas which has passed through the turbine and before merging with the exhaust gas that has passed through the bypass passage. The electronic control unit allows the turbine inflow exhaust gas flow rate to become lower as the temperature of the first exhaust gas control catalyst is lowered or the post-turbine passage exhaust gas temperature is lowered when the turbine inflow exhaust gas flow rate is controlled to reach the flow rate lower than the post-warm-up flow rate when the operating state of the internal combustion engine remains constant.

The post-turbine passage exhaust gas temperature is affected by, for example, the flow rate and the temperature of the exhaust gas flowing into the turbine, the heat capacity of the turbine, the turbine temperature, and the rotation speed of the turbine. The warm-up system for the exhaust gas apparatus is capable of estimating the post-turbine passage exhaust gas temperature based on the parameters related to the post-turbine passage exhaust gas temperature. The post-turbine passage exhaust gas temperature is estimated from only those of the parameters that have a larger effect than the others on the post-turbine passage exhaust gas temperature (such as the temperature of the exhaust gas flowing into the turbine and the turbine temperature). Alternatively, the temperature of the exhaust gas that flows through the section of the turbine side exhaust gas passage which is provided downstream of the turbine is measured for the post-turbine passage exhaust gas temperature to be estimated based on that temperature.

As described above, the temperature of the first exhaust gas control catalyst is likely to fall when the catalyst inflow exhaust gas flowing into the first exhaust gas control catalyst through the turbine has a low temperature. In other words, the temperature of the first exhaust gas control catalyst becomes likely to fall as the post-turbine passage exhaust gas temperature related to the temperature of the catalyst inflow exhaust gas decreases. As described above, the turbine warm-up completion state and the temperature of the first exhaust gas control catalyst are closely related to each other. Accordingly, the warm-up of the turbine can be suitably performed by the turbine inflow exhaust gas flow rate being controlled based on the temperature of the first exhaust gas control catalyst and the post-turbine passage exhaust gas temperature.

Specifically, the electronic control unit that the warm-up system for the exhaust gas apparatus is provided with reduces the turbine inflow exhaust gas flow rate as the post-turbine passage exhaust gas temperature decreases. Once the turbine and the turbine side exhaust gas passage are heated by the control by the electronic control unit for performing the warm-up of the turbine, the post-turbine passage exhaust gas temperature becomes likely to rise. As a result, the turbine inflow exhaust gas flow rate tends to become likely to increase. Once the turbine inflow exhaust gas flow rate has become likely to increase, the turbine and the turbine side exhaust gas passage are likely to be further heated. Accordingly, the electronic control unit is capable of completing the warm-up of the turbine as quickly as possible while maintaining the warm-up completion state of the first exhaust gas control catalyst by performing the control described above.

The temperature difference between the activation temperature and the temperature of the first exhaust gas control catalyst decreases as the temperature of the warmed-up first exhaust gas control catalyst equal to or higher than the activation temperature decreases. Once the exhaust gas flows into the first exhaust gas control catalyst through the turbine when the warm-up of the turbine has not been completed yet, the temperature of the first exhaust gas control catalyst is more likely to fall below the activation temperature of the first exhaust gas control catalyst when the temperature difference is small than when the temperature difference is large. In this regard, the electronic control unit reduces the turbine inflow exhaust gas flow rate as the temperature of the first exhaust gas control catalyst decreases. In other words, the electronic control unit increases the turbine inflow exhaust gas flow rate when the first exhaust gas control catalyst has a high temperature. In this case, the temperature difference is large, and thus falling of the temperature of the first exhaust gas control catalyst below the activation temperature of the first exhaust gas control catalyst is likely to be avoided even if the turbine inflow exhaust gas flow rate is high. Once the turbine inflow exhaust gas flow rate becomes high, the turbine and the turbine side exhaust gas passage are likely to be heated. By controlling the turbine inflow exhaust gas flow rate in accordance with the temperature of the first exhaust gas control catalyst as described above, the electronic control unit is capable of completing the warm-up of the turbine as quickly as possible while maintaining the warm-up completion state of the first exhaust gas control catalyst.

Once the warm-up of the turbine is completed, the turbine inflow exhaust gas flow rate reaches the post-warm-up flow rate depending on the operation state of the internal combustion engine as described above. Once the warm-up of the turbine can be completed as quickly as possible at this time by the control of the turbine inflow exhaust gas flow rate by the electronic control unit, the turbine inflow exhaust gas flow rate quickly reaches the post-warm-up flow rate at which the back pressure of the internal combustion engine can become as low as possible.

According to the aspect, the warm-up system for the exhaust gas apparatus is capable of completing the warm-up of the turbine as quickly as possible while maintaining the warm-up completion state of the first exhaust gas control catalyst by controlling the turbine inflow exhaust gas flow rate at a time when the warm-up of the turbine is performed as described above. As a result, the exhaust gas apparatus is suitably warmed-up and a decline in the exhaust gas control capacity of the exhaust gas control catalyst can be suitably suppressed.

In the aspect, the exhaust gas apparatus further include a second exhaust gas control catalyst disposed on the exhaust gas passage provided downstream of the first exhaust gas control catalyst. The electronic control unit is configured to control the turbine inflow exhaust gas flow rate, by using the adjustment unit, to reach the post-warm-up flow rate which depends on the operation states of the internal combustion engine, after the second exhaust gas control catalyst, the first exhaust gas control catalyst and the turbine are warmed. The electronic control unit is configured to perform a third warm-up control which warms the second exhaust gas control catalyst by controlling the turbine inflow exhaust gas flow rate, by using the adjustment unit, to reach zero, when the turbine is warmed and a temperature of the second exhaust gas control catalyst is lower than an activation temperature of the second exhaust gas control catalyst.

In this exhaust gas apparatus, the exhaust gas is controlled by the first exhaust gas control catalyst and the second exhaust gas control catalyst. The exhaust gas control capacity of the exhaust gas apparatus is insufficient when the warm-up of the second exhaust gas control catalyst is yet to be completed after the completion of the warm-up of the first exhaust gas control catalyst in the exhaust gas apparatus. In this regard, tire electronic control unit that the warm-up system for the exhaust gas apparatus is provided with controls the turbine inflow exhaust gas flow rate by using the adjustment unit, such that the turbine inflow exhaust gas flow rate reaches zero, when the warm-up of the second exhaust gas control catalyst is yet to be completed with the warm-up of the turbine already completed. At this time, the exhaust gas flows into the first exhaust gas control catalyst and the second exhaust gas control catalyst through the bypass passage, and thus the temperature of the second exhaust gas control catalyst rises relatively quickly. This is because the temperature of the exhaust gas falls once the exhaust gas passes through the turbine even if the turbine is in the warm-up completion state. By controlling the turbine inflow exhaust gas flow rate as described above, the electronic control unit is capable of completing the warm-up of the second exhaust gas control catalyst relatively early.

When a turbocharging request is established during the warm-up of the exhaust gas apparatus (warm-up in the order of the first exhaust gas control catalyst, the turbine, and the second exhaust gas control catalyst), the warm-up control for the exhaust gas apparatus (warm-up control by the electronic control unit) is stopped for the turbocharging request to be responded to or the warm-up control continue to be performed. When the turbocharging request is established during the execution of the warm-up control for the second exhaust gas control catalyst by the electronic control unit and the turbocharging request is to be responded to, the warm-up system for the exhaust gas apparatus stop the control and adjust the turbine inflow exhaust gas flow rate to a flow rate responding to the request. Although the turbine temperature falls during the warm-up of the second exhaust gas control catalyst by the electronic control unit, the amount of the decline is small since the turbine has a high heat capacity. Accordingly, the warm-up completion state of the turbine tends to be maintained in substances even during the execution of the warm-up control for the second exhaust gas control catalyst by the electronic control unit. As a result, the first exhaust gas control catalyst is capable of maintaining its warm-up completion state even if the turbine inflow exhaust gas flow rate is adjusted to the flow rate responding to the request in response to the turbocharging request during the execution of the warm-up control for the second exhaust gas control catalyst by the electronic control unit. In other words, the warm-up system for the exhaust gas apparatus is capable of being prepared for the turbocharging request during the execution of the warm-up control for the second exhaust gas control catalyst while maintaining the exhaust gas control capacity by the first exhaust gas control catalyst by initiating the warm-up of the second exhaust gas control catalyst after the completion of the warm-up of the turbine.

According to the aspect, the warm-up system for the exhaust gas apparatus is capable of completing the warm-up of the second exhaust gas control catalyst by the electronic control unit relatively early by controlling the turbine inflow exhaust gas flow rate as described above. As a result, the exhaust gas apparatus is suitably warmed-up and a decline in the exhaust gas control capacity of the exhaust gas control catalyst can be suppressed.

In the aspect, the exhaust gas passage includes the turbine side exhaust gas passage passing through the turbine from the branching portion where the bypass passage branches. The adjustment unit includes a first valve disposed on a passage between the branching portion and the turbine on the turbine side exhaust gas passage and adjusting the flow rate of the exhaust gas flowing into the turbine and a second valve disposed on the bypass passage and adjusting the flow rate of the exhaust gas flowing through the bypass passage.

In the aspect, the exhaust gas passage includes the turbine side exhaust gas passage passing through the turbine from the branching portion where the bypass passage branches. The adjustment unit includes the distribution valve disposed in the merging portion where the turbine side exhaust gas passage and the bypass passage merge with each other.

According to the aspect, a decline in the exhaust gas control capacity of an exhaust gas control catalyst can be suppressed by an exhaust gas apparatus being suitably warmed-up.

What is claimed is:

1. A warm-up system for an exhaust gas apparatus for an internal combustion engine, the warm-up system comprising:
    the exhaust gas apparatus including:
        a turbocharger provided with a turbine, the turbocharger being disposed in an exhaust gas passage of the internal combustion engine,
        a first exhaust gas control catalyst disposed in the exhaust gas passage disposed downstream of the turbine,
        a bypass passage which branches from the exhaust gas passage upstream of the turbine, bypasses the turbine, and merges with the exhaust gas passage disposed upstream of the first exhaust gas control catalyst, and
        an adjustment valve configured to adjust a turbine inflow exhaust gas flow rate, which is a flow rate of exhaust gas flowing into the turbine, by changing a ratio between the turbine inflow exhaust gas flow rate and a flow rate of exhaust gas flowing into the bypass passage; and
    an electronic control unit configured to control the turbine inflow exhaust gas flow rate by using the adjustment valve, such that the turbine inflow exhaust gas flow rate reaches a post-warm-up flow rate which depends on operation states of the internal combustion engine, after the first exhaust gas control catalyst and the turbine are warmed, wherein:

the electronic control unit is configured to perform a first warm-up control which warms the first exhaust gas control catalyst by controlling the turbine inflow exhaust gas flow rate, by using the adjustment valve, to reach zero, when a temperature of the first exhaust gas control catalyst is lower than an activation temperature of the first exhaust gas control catalyst; and the electronic control unit is configured to perform a second warm-up control which warms the turbine by controlling the turbine inflow exhaust gas flow rate, by using the adjustment valve, to reach a flow rate higher than zero and lower than the post-warm-up flow rate when an operating state of the internal combustion engine remains constant, such that a warmed state of the first exhaust gas control catalyst is maintained after the first exhaust gas control catalyst is warmed by the first warm-up control.

2. The warm-up system according to claim 1, wherein the electronic control unit is configured to control the turbine inflow exhaust gas flow rate based on the temperature of the first exhaust gas control catalyst and a post-turbine passage exhaust gas temperature, which is a temperature of the exhaust gas which has passed through the turbine and before merging with the exhaust gas that has passed through the bypass passage; and the electronic control unit is configured to allow the turbine inflow exhaust gas flow rate to become lower as the temperature of the first exhaust gas control catalyst is lowered or the post-turbine passage exhaust gas temperature is lowered when the turbine inflow exhaust gas flow rate is controlled to reach the flow rate lower than the post-warm-up flow rate when the operating state of the internal combustion engine remains constant.

3. The warm-up system according to claim 1, wherein the exhaust gas apparatus further includes a second exhaust gas control catalyst disposed in the exhaust gas passage provided downstream of the first exhaust gas control catalyst;

the electronic control unit is configured to control the turbine inflow exhaust gas flow rate, by using the adjustment valve, to reach the post-warm-up flow rate which depends on the operation states of the internal combustion engine, after the second exhaust gas control catalyst, the first exhaust gas control catalyst and the turbine are warmed; and the electronic control unit is configured to perform a third warm-up control which warms the second exhaust gas control catalyst by controlling the turbine inflow exhaust gas flow rate, by using the adjustment valve, to reach zero, when the turbine is warmed and a temperature of the second exhaust gas control catalyst is lower than an activation temperature of the second exhaust gas control catalyst.

4. The warm-up system according to claim 1, wherein the exhaust gas passage includes a turbine side exhaust gas passage passing through the turbine from a branching portion where the bypass passage branches; and the adjustment valve includes a first valve and a second value;

the first valve is disposed in a passage between the branching portion and the turbine on the turbine side exhaust gas passage and the first valve adjusts the flow rate of the exhaust gas flowing into the turbine; and the second valve is disposed in the bypass passage and the second valve adjusts the flow rate of the exhaust gas flowing through the bypass passage.

5. The warm-up system according to claim 1, wherein the exhaust gas passage includes a turbine side exhaust gas passage passing through the turbine from a branching portion where the bypass passage branches; and the adjustment valve includes a distribution valve disposed in a merging portion where the turbine side exhaust gas passage and the bypass passage merge with each other.

* * * * *